US008550368B2

(12) United States Patent
Butler et al.

(10) Patent No.: US 8,550,368 B2
(45) Date of Patent: Oct. 8, 2013

(54) INTERACTIVE CONTROL SYSTEM FOR AN HVAC SYSTEM

(75) Inventors: William P. Butler, St. Louis, MO (US); James P. Garozzo, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 1806 days.

(21) Appl. No.: 11/526,268

(22) Filed: Sep. 22, 2006

(65) Prior Publication Data

US 2007/0012052 A1 Jan. 18, 2007

Related U.S. Application Data

(63) Continuation-in-part of application No. 11/063,806, filed on Feb. 23, 2005, now Pat. No. 7,296,426.

(51) Int. Cl.
*F23N 1/00* (2006.01)
(52) U.S. Cl.
USPC ............ 236/1 E; 236/1 C; 236/91 F; 62/180; 62/183; 165/207
(58) Field of Classification Search
USPC ..... 236/1 C, 1 E, 91 F; 165/207; 62/180, 183
See application file for complete search history.

(56) References Cited

U.S. PATENT DOCUMENTS

| | | | | |
|---|---|---|---|---|
| 3,643,457 | A | * | 2/1972 | Winkler ........................ 62/140 |
| 5,265,436 | A | * | 11/1993 | Murata et al. ................. 62/175 |
| 5,457,965 | A | | 10/1995 | Blair et al. |
| 5,623,834 | A | | 4/1997 | Bahel et al. |
| 7,032,397 | B1 | | 4/2006 | Mueller et al. |
| 2004/0079093 | A1 | * | 4/2004 | Gauthier et al. ............... 62/157 |
| 2004/0154319 | A1 | | 8/2004 | Jayanth et al. |

OTHER PUBLICATIONS

U.S. Appl. No. 10/750,113, filed Dec. 2003, Mueller.

* cited by examiner

*Primary Examiner* — Frantz F. Jules
*Assistant Examiner* — Azim Abdur Rahim
(74) *Attorney, Agent, or Firm* — Harness, Dickey & Pierce, P.L.C.

(57) ABSTRACT

An interactive system for controlling the operation of an HVAC system is provide that comprises a thermostat for initiating the operation of the HVAC system in either a full capacity mode of operation or at least one reduced capacity mode of operation, and a controller for an outside condenser unit having a condenser fan motor and a compressor motor, the controller being capable of operating the compressor in a full capacity mode and at least one reduced capacity mode. The system also comprises a controller for an indoor blower unit having a blower fan motor, the controller being capable of operating the blower fan motor in a full capacity mode an at least one reduced capacity mode. The system further includes a communication means for transmitting information between the outside condenser unit controller and at least the indoor blower controller, where the information relates to the operation of the indoor blower and the outdoor condenser unit. The indoor blower controller responsively controls the operation of the blower fan motor in a full capacity mode or a reduced capacity mode based on the information received from the outdoor unit controller, and the outdoor unit controller responsively controls the operation of the compressor in a full capacity mode or a reduced capacity mode based on the information received from the indoor blower controller.

9 Claims, 8 Drawing Sheets

US 8,550,368 B2

INTERACTIVE CONTROL SYSTEM FOR AN HVAC SYSTEM

CROSS REFERENCE TO RELATED APPLICATIONS

This application is a continuation-in-part of commonly assigned, U.S. patent application Ser. No. 11/063,806 filed Feb. 23, 2005 now U.S. Pat. No. 7,296,426, which is hereby incorporated herein by reference.

FIELD OF THE INVENTION

The present invention relates to controllers for interactively controlling an HVAC system, and more particularly to an integrated system of individual controllers for interactively controlling various components in the HVAC system.

BACKGROUND OF THE INVENTION

Many present HVAC systems employ a plurality of controllers for communicating information within a master/slave network, in which a "master" thermostat or similar central controller is the master that coordinates communication between the various slave components within the HVAC system. Such networks require various subordinate controllers to be configured for communication with and control by a master thermostat or communication controller, without which the system's subordinate controllers can not communicate to operate various components of the HVAC system. Thus, the various HVAC component controllers rely on the master controller to communicate operating instructions and system diagnostics, and each controller does not independently manage its operation based on diagnostic information transmitted by other subordinate HVAC controllers.

SUMMARY OF THE INVENTION

The present invention provides for an interactive control system for controlling the operation of various controllers in an HVAC system. The interactive system comprises a thermostat for initiating the operation of the HVAC system in either a full capacity mode of operation or at least one reduced capacity mode of operation, and a controller for an outside condenser unit having a condenser fan motor and a compressor motor, the controller being capable of operating the compressor in a full capacity mode and at least one reduced capacity mode. The system also comprises a controller for an indoor blower, which is capable of operating a blower fan motor in a full capacity mode and in at least one reduced capacity mode. The interactive system further includes a communication means for transmitting information between the outside condenser unit controller and the indoor blower controller relating to the operation of the condenser unit components and the blower components, where the indoor blower controller responsively controls the operation of the blower fan motor in a full capacity mode or a reduced capacity mode based on the information received from the outdoor unit controller. The outdoor unit controller may responsively control the operation of the compressor in a full capacity mode or a reduced capacity mode based on the information received from the indoor blower controller.

In one aspect of the present invention, some embodiments of an interactive system may comprise at least two controllers that communicate with each other to provide a method of controlling the operation of an HVAC system in either a full capacity mode of operation or a reduced capacity mode of operation based on the communication between the at least two controllers of information relating to the operation of various components in the HVAC system.

In another aspect of the present invention, some embodiments of an interactive system having two or more controllers are provided that are capable of detecting component operating parameters and communicating the operating parameter information to at least one other controller to enable confirming diagnostics for predicting potential component failure or required servicing. These and other features and advantages will be in part apparent, and in part pointed out hereinafter.

BRIEF DESCRIPTION OF THE DRAWINGS

Corresponding reference numerals indicate corresponding parts throughout the several views of the drawings.

DETAILED DESCRIPTION OF THE EMBODIMENTS

Figure 1:
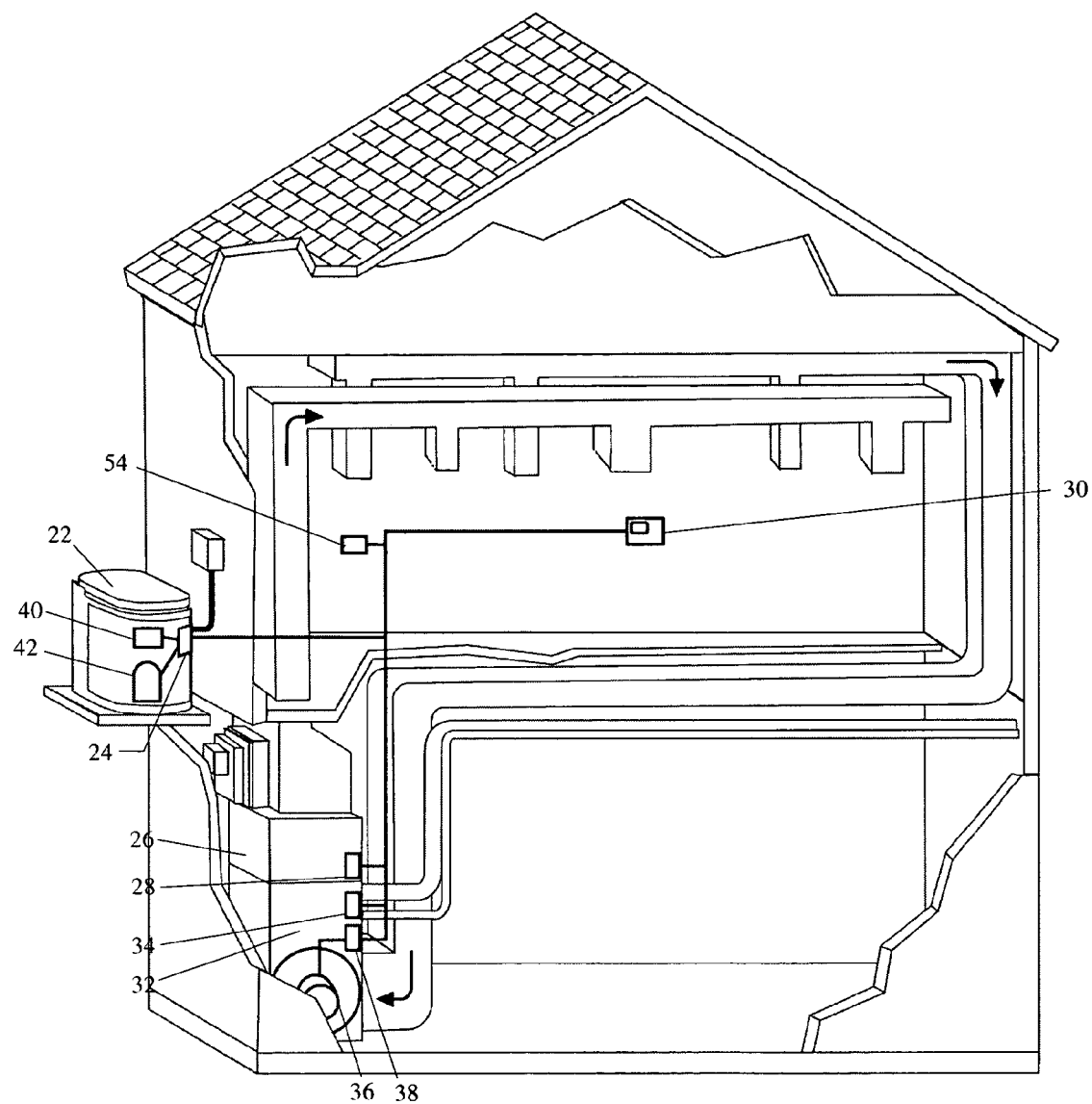
FIG. 1 is an illustration of a building with one embodiment of an interactive control system for an HVAC system according to the principles of the present invention.

Various embodiments of interactive systems are provided that include a plurality of interactive controllers for controlling the operation of a climate control system, such as that shown in FIG. 1. As shown and described, the climate control system preferably includes at least one air conditioner comprising an outdoor condenser unit 22. In one embodiment of an interactive system, the climate control system has a controller 24 for the outdoor air conditioner unit, at least one indoor blower unit 26 having an indoor blower controller 28 and at least one thermostat 30 for directing the operation of the various units. The climate control system may further comprise a heating unit 32, such as an electric or gas-fired furnace, and a related furnace controller 34. The climate control system preferably comprises a air circulator blower unit 26 having a blower motor 36. The circulator blower motor 36 may optionally comprise a blower motor controller 38. The thermostat 30 is capable of sensing the temperature within the space and responsively initiating operation of an air conditioning or furnace unit when the sensed temperature is more than a predetermined amount above or below a set point temperature of the thermostat 30. In response to a thermostat signal request for cooling, the outdoor unit controller 24 will control the switching of power to both a condenser fan motor 40 and a compressor motor 42, and the indoor blower controller 28 controls the blower motor 36 or the blower motor controller 38 to provide for air conditioning operation. Likewise, when the thermostat 30 signals a request for heating, the furnace controller 34 controls the activation of the furnace 32 and the blower motor controller 38 controls the blower motor 36 or the blower motor controller 38 to provide for heating operation. Each of the various controllers may be connected to either a high voltage power source or a low voltage power source. The outdoor unit controller 24 may be configured to control a multi-capacity compressor motor 42 as well as a variable speed condenser fan motor 40. Likewise, the indoor air handler/blower controller 28 and the furnace controller 34 may be configured to establish multiple operating speeds of the circulator blower motor 36. The optional blower motor controller 38 may also comprise an integral inverter driver for enabling variable speed control of the blower motor.

In the various embodiments of an interactive system, the various controllers that control individual components within the climate control system are further capable of receiving communication from other controller and components, to interactively control and improve the operation of the climate control system. For example, some embodiments a climate control system may comprise an indoor blower controller 28 and an outdoor unit controller 24 that communicate via a network, where the controllers 24 and 28 do not communicate with a thermostat 30 via the network. The thermostat 30 may be a conventional thermostat that requests low stage cooling by sending a conventional 24 volt signal via a "Y1" line to the indoor blower controller 28 and to the outdoor unit controller 24. During the request for cooling from the thermostat 30, the indoor blower controller 28 may experience a blower motor failure and communicate the fault to the outdoor unit controller 24, which would responsively discontinue operation of the outdoor unit to protect the compressor 40 from being damaged. In this example, the communication between the individual controllers 24 and 28 mitigates damage by discontinuing operation, regardless of whether the conventional thermostat 30 is still calling for low stage cooling operation. It should be noted that the indoor and outdoor controllers 28 and 24 may be used with either a conventional thermostat 30, or an interactive thermostat 30 that is configured to be connected to a network 48. An interactive thermostat that is connected to the communication network 48 may send a cooling request signal via the network 48, rather than through the conventional 24 volt wire connections to the indoor blower unit controller 28 and outdoor unit controller 24. Where an interactive thermostat 30 is connected to the communication network 48, the thermostat would be capable of receiving the blower motor fault signal and responsively discontinuing its cooling request signal and notifying the occupant of the blower motor failure. Additionally, the thermostat 30 may also communicate the fault signal to an outside location, such as a service contractor or a system monitoring service provider.

Figure 2:
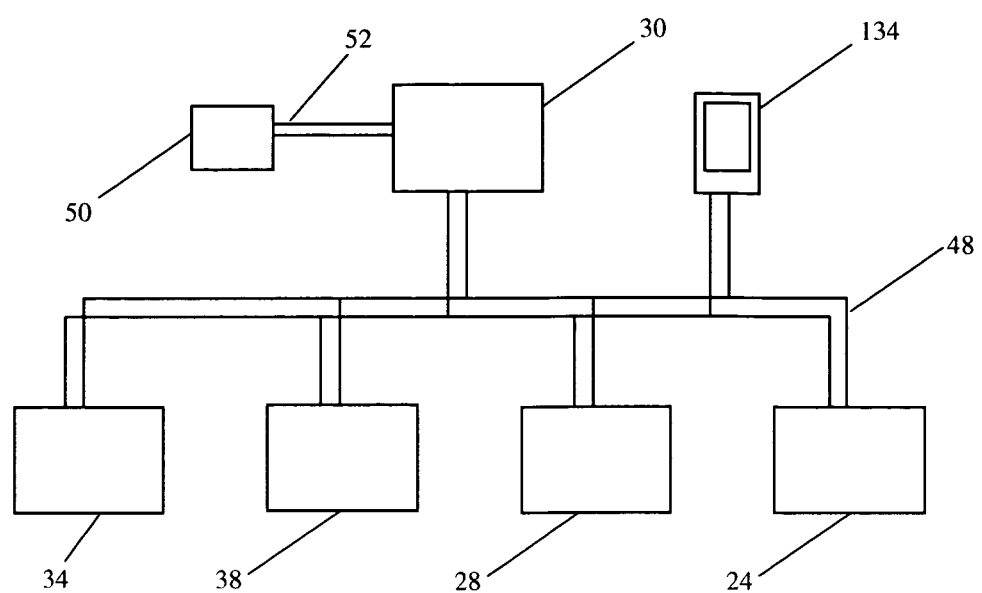
FIG. 2 is a functional block diagram of one embodiment of an interactive system for controlling an HVAC system.

One communication means that may be employed by the various embodiments is shown in FIG. 2. The communication means comprises a two-wire peer-to-peer network 48, such as an RS-485 peer-to-peer Local Area Network, but may alternatively comprise any other comparable network suitable for use in a peer-to-peer arrangement. An RS-485 network is a two-wire, multi-drop network that allows multiple units to share the same two wires in sending and receiving information. The two-wire network 48 connects to a transmitter and receiver of each controller in the HVAC system (up to 32 controller units). The controllers are always enabled in the receiver mode, monitoring the network 48 for information. Only one transmitter can communicate or occupy the network 48 at a time, so each individual controller may be configured at the time of manufacture to transmit at a fixed time period after the last transmission, where each controller has a time period that is unique to that controller. Thus, after one controller completes its transmission, another controller will wait for the prescribed time period before transmitting its information. In this manner, collisions of data transmission from different controllers may be avoided. The transmissions may also include leader information at the beginning of each transmission to identify at least the transmitting controller.

The network may also be configured to provide for communication with an outside location 50 (eg. outside the home) utilizing, for example, a ModBus link 52, through either the thermostat 30, or through a separate network controller/coordinator, which may provide for an interface or gateway with a ModBus link for communicating between the various component controllers and a ModBus network at an outside location. An example of such a network controller is a RZ 100E RS-485 peer-to-peer network controller sold by Richards Zeta corporation. The network controller/coordinator can send and receive information to and from the various controllers via the network, and may comprise a transceiver for wireless communication of information to a hand held palm or laptop.

Where the thermostat 30 is in communication with an external ModBus link 52, the thermostat 30 may transmit specific parameter or diagnostic information relating to the individual controllers and system components to an outside location 50 such as a monitoring service provider. The outside location 50 could also send commands to the thermostat 30 to control the operation of the climate control system or to request specific operating parameter information. The thermostat 30 could accordingly function as a gateway for communicating with an outside location 50, and could be remotely controlled by the outside location 50.

Figure 3:
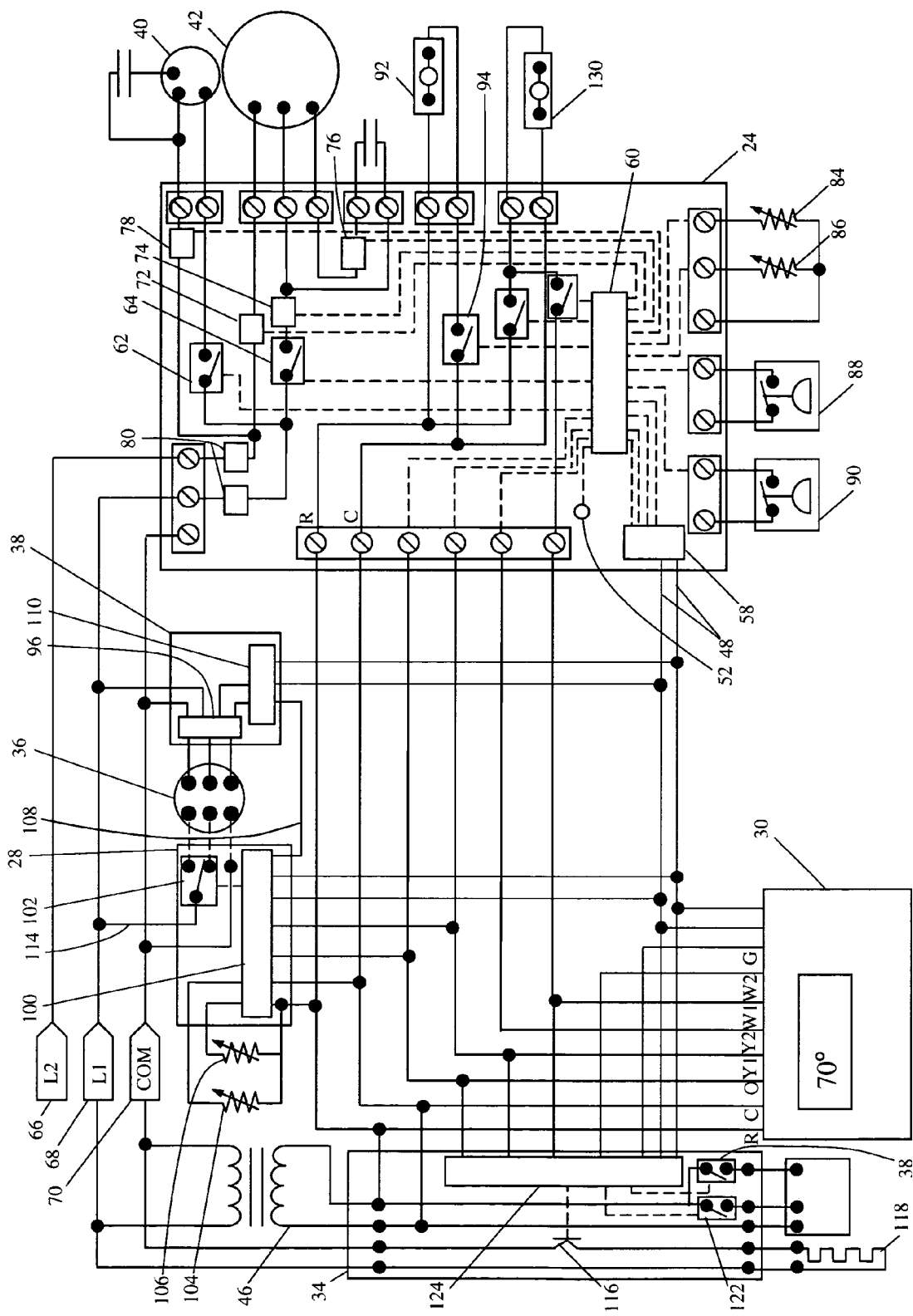
FIG. 3 is a schematic of one embodiment of the interactive system.

One first embodiment of an interactive controller 24 is shown in FIG. 3. The interactive outdoor air conditioning compressor unit controller 24 may comprise a processor 60 and a plurality of switching means 62, 64 for controlling the switching of line voltage 66, 68 to the compressor motor 42 and the condenser fan motor. The switching means preferably comprise relays such as a A22500P2 relay manufactured by American Zettler. The condenser fan motor relay 62 and at least one compressor motor relay 64 are also in connection with the processor 60. The processor 60 may be a 28 pin PIC16F microprocessor manufactured by Microchip. Relays 62 and 64 have first and second contacts, at least one of which may be in communication with the processor 60, and preferably at least the non-moving contact of which is in communication with the processor. The processor 60 is able to activate the relay and sense voltage at the stationary contact to verify when the contacts are closed and open. Thus, the processor 60 has the capability of determining when the relay contacts have stuck closed when the processor has requested the relay to be switched to an open position.

The outdoor unit controller 24 can include a low voltage power supply that is preferably a half wave regulated power supply (not shown) comprising a diode in series with a transistor and a regulating capacitor and zener diode for gating the transistor. The power supply may also be a small transformer and zener diode circuit. The low voltage power supply powers the processor 60, which includes a plurality of Analog to Digital data inputs for receiving information from various data inputs in connection with the outdoor unit controller 24. One particular outdoor condenser unit controller 24 that may be used in the present invention is the 49H22 Unitary Control manufactured by White-Rodgers, a Division of Emerson Electric Co.

The outdoor unit controller 24 also receives input from a plurality of sensors 72 through 90 for monitoring operating parameters of the outdoor unit components. These sensors may include current sensors 72, 74 and 76 for sensing the current level in the start winding and run winding of the compressor motor 42, and a sensor 78 for sensing the current in the condenser fan motor 40. Other sensors may include a sensor 80 for sensing the magnitude of the line voltage to the motors, a temperature sensor 82 for sensing the condenser coil temperature, a temperature sensor 84 for sensing the outside ambient temperature, and a temperature sensor 86 for sensing the compressor's refrigerant Discharge Line Temperature (DLT). The compressor of the outdoor unit 22 is preferably a scroll compressor, and may be for example a two-step scroll compressor manufactured by Copeland Corporation. This scroll compressor includes a high capacity operating level and a solenoid 92 for actuating a mid-capacity operating level. The outdoor unit controller 24 controls a switch 94 for actuating the mid-capacity solenoid 92 of the compressor. The outdoor unit controller 24 is configured to provide diagnostic information or codes based on the current values obtained from the current sensors 72, 74 and 78 for monitoring the current in the condenser fan motor 40 and the compressor motor 42. This current sensing may provide diagnostic information or fault codes such as a repeated motor protector trip fault, welded contacts in the switching relays 62 and 64, an open start winding circuit, an open run winding circuit, or a locked rotor current fault. The outdoor unit controller may communicate these failures through a com-port 58 to the network connection 48, and/or may communicate the failures locally through a flashing multi-color status LED 56. Examples of the diagnostic information or fault codes relating to the compressor or condenser fan that may be communicated are shown in the table below.

TABLE 1
EXAMPLE FAULT CODES FOR AN OUTDOOR
COMPRESSOR AND CONDENSER FAN UNIT

| Status LED | Status LED Description | Status LED Troubleshooting Information |
|---|---|---|
| Green "POWER" | Module Has Power | Supply voltage is present at module terminals |
| Red "TRIP" | Thermostat demand signal Y1 is present, but the compressor is not running | 1. Compressor protector is open<br>   Check for high head pressure<br>   Check compressor supply voltage<br>2. Outdoor unit power disconnect is open<br>3. Compressor circuit breaker or fuse(s) is open<br>4. Broken wire or connector is not making contact<br>5. Low pressure switch open if present in system<br>6. Compressor contact has failed open |
| Yellow "ALERT" Flash Code 1 | Long Run Time Compressor is running extremely long run cycles | 1. Low refrigerant charge<br>2. Evaporator blower is not running<br>   Check blower relay coil and contacts<br>   Check blower motor capacitor<br>   Check blower motor for failure or blockage<br>   Check evaporator blower wiring and connectors<br>   Check indoor blower control board<br>   Check thermostat wiring for open circuit<br>3. Evaporator coil is frozen<br>   Check for low suction pressure<br>   Check for excessively low thermostat setting<br>   Check evaporator airflow (coil blockages or return air filter)<br>   Check ductwork or registers for blockage<br>4. Faulty metering device<br>   Check TXV bulb installation (size, location, contact)<br>5. Condenser coil is dirty<br>6. Liquid line restriction (Filter drier blocked if present in system)<br>7. Thermostat is malfunctioning<br>   Check thermostat sub-base or wiring for short circuit<br>   Check thermostat installation (location, level) |
| Yellow "ALERT" Flash Code 2 | System Pressure Trip Discharge or suction pressure out of limits or compressor overloaded | 1. High head pressure<br>   Check high pressure switch if present in system<br>   Check if system is overcharged with refrigerant<br>   Check for non-condensable in system<br>2. Condenser coil poor air circulation (dirty, blocked, damaged)<br>3. Condenser fan is not running<br>4. Return air duct has substantial leakage<br>5. If low pressure switch present in system, refer to Flash Code 1 |
| Yellow "ALERT" Flash Code 3 | Short Cycling Compressor is running only briefly | 1. Thermostat demand signal is intermittent<br>2. Time delay relay or control board defective<br>3. If high pressure switch is present, refer to Flash Code 2<br>4. If low pressure switch present, refer to |

TABLE 1-continued

TABLE 1
EXAMPLE FAULT CODES FOR AN OUTDOOR
COMPRESSOR AND CONDENSER FAN UNIT

| Status LED | Status LED Description | Status LED Troubleshooting Information |
|---|---|---|
| Yellow "ALERT" Flash Code 4 | Locked Rotor | Flash Code 1<br>1. Run capacitor has failed.<br>2. Low line voltage (contact utility if voltage at disconnect is low)<br>3. Excessive liquid refrigerant in compressor<br>4. Compressor bearings are seized<br>Measure compressor oil level |
| Yellow "ALERT" Flash Code 5 | Open Circuit | 1. Outdoor unit power disconnect is open<br>2. Compressor circuit breaker or fuse(s) is open<br>3. Compressor contactor has failed open<br>Check compressor contactor wiring and connectors<br>Check for compressor contactor failure (burned, pitted, or open)<br>Check wiring and connectors between supply and compressor<br>Check for low pilot voltage at compressor contactor coil<br>4. High pressure switch is open and requires manual reset.<br>5. Open circuit in compressor supply wiring or connections<br>6. Unusually long compressor protector reset time due to extreme ambient temperature<br>7. Compressor windings are damaged<br>Check compressor motor winding resistance |
| Yellow "ALERT" Flash Code 6 | Open Start Circuit Current only in run circuit | 1. Run capacitor has failed.<br>2. Open circuit in compressor start wiring or connections<br>Check wiring and connectors between supply and the compressor "S" terminal<br>3. Compressor start winding is damaged<br>Check compressor motor winding resistance |
| Yellow "ALERT" Flash Code 7 | Open Run Circuit Current only in start circuit | 1. Open circuit in compressor run wiring or connections<br>Check wiring and connectors between supply and the compressor "R" terminal<br>2. Compressor run winding is damaged |
| Yellow "ALERT" Flash Code 8 | Welded Contactor Compressor always runs | 1. Compressor contactor has failed closed<br>2. Thermostat demand signal not connected to module. |
| Yellow "ALERT" Flash Code 9 | Low Voltage Control Circuit <17VAC | 1. Control circuit transformer is overloaded<br>2. Low line voltage (contact utility if voltage at disconnect is low)<br>Check wiring connections |

In one situation, the outdoor unit controller 24 may respond to sensing an open circuit or locked rotor condition in the condenser fan motor 40 by discontinuing operation of the compressor motor 42 and communicating via the network 48 a condenser fan motor failure to the other controllers 28, 30 and 38 in the HVAC system. The indoor blower controller 28 and blower motor controller 38 could respond by discontinuing operation until the fault condition is removed, regardless of whether the thermostat 30 may be calling for cooling operation. The outdoor unit controller 24 may also respond to sensing an open circuit or locked rotor condition of the compressor motor 42 by discontinuing operation of the condenser fan motor 40 and communicating via the network 48 a compressor motor failure to the other controllers 28, 30 and 38 in the HVAC system. The processor 60 of the outdoor unit controller 24 may also control the speed of the condenser fan motor 40, where a variable speed motor is utilized, based on the sensed ambient temperature data received from the temperature sensor 84. When the thermostat 30 is calling for cooling operation and the sensed outside ambient temperature is relatively low, as in an overnight or early morning situations, the outdoor unit controller 24 may responsively operate the condenser fan motor 40 at a reduced speed for reducing the operating noise level of the outside unit 22.

Likewise, in the situation where the thermostat 30 is calling for cooling and the outdoor unit controller 24 receives a communication via the network connection 48 of an indoor blower motor failure, the outdoor unit controller 24 will respond by discontinuing the operation of the outdoor unit components to protect the compressor motor 42 from possible damage. Similarly, in the situation where the thermostat 30 is calling for high capacity "Y2" second stage cooling, the outdoor unit controller 24 may receive a communication via the network connection 48 of a reduced speed for the indoor blower motor 36 due to overheating of the inverter drive circuit 96 in the blower motor controller 38. The outdoor unit controller 24 will respond by switching relay 94 for actuating the mid-capacity solenoid 92 to operate the compressor at a reduced capacity to correspond to the reduced blower motor speed, regardless of whether the thermostat 30 is calling to high capacity "Y2" second stage cooling. This provides for a limp-along mode that will still provide some degree of cooling, while running the compressor at a capacity corresponding to the reduced speed of the indoor blower motor 36 to provide safe operation for the compressor.

In a situation where the thermostat 30 is calling for full capacity "Y2" second stage cooling and the line voltage 66, 68 to the compressor motor 42 is sensed to be significantly below rated operating voltage of the compressor motor 42, the outdoor controller 24 may discontinue compressor operation at full capacity, and switch the relay 94 for actuating the mid-capacity solenoid 92 to operate the compressor at the mid-capacity level. The outdoor unit controller 24 may then communicate a high capacity compressor lockout fault via the network 48 to the indoor unit controller 28, which would responsively request the blower motor controller 38 to operate the blower motor 36 at the reduced speed corresponding to "Y1" first stage operation, regardless of whether the thermostat 30 is calling for "Y2" second stage cooling. If the thermostat 30 is connected to the communication network 48, the thermostat 30 may respond to the high capacity compressor lock-out fault by only calling for low capacity "Y1" second stage cooling, and by notifying the occupant or an outside location 50 of the low line voltage and high capacity compressor lock-out fault.

The outdoor unit controller 24 may also provide a high side pressure fault, which may be sensed by either a pressure sensor 88 or by the sensed compressor motor current at 72, 74 and 76. For example, in the Copeland scroll compressor, the sensed motor current is approximately linear with respect to the sensed high side refrigerant pressure, and is also an indirect way of measuring the compressor's high side pressure. In the situation where the compressor's high side pressure is excessive, the outdoor unit controller 24 may respond by switching the relay 94 for actuating the mid-capacity solenoid of the scroll compressor to operate the compressor at a mid-capacity level. The outside unit controller 24 may then communicate a high side pressure fault condition via the network 48 to the other system controllers 28, 30, and 38. The indoor blower controller 28 may then respond by requesting the blower motor controller 38 to operate the blower motor 36 at the reduced speed corresponding to "Y1" first stage operation, regardless of whether the thermostat 30 is calling for "Y2" second stage cooling. If the thermostat 30 is connected to the communication network 48, the thermostat 30 may respond to the high capacity compressor lock-out fault by only calling for low capacity "Y1" second stage cooling. The thermostat 30 may also notify the occupant or an outside location 50 of the low line voltage and high capacity compressor lock-out fault. This provides a limp along mode of operation at less than full capacity that will still provide some degree of cooling.

In the above situation of a compressor high side pressure fault, the outdoor unit controller 24 may also provide another limp along mode of operation that limits full capacity compressor operation to a minimum time duration by cycling the compressor on and off. This would still provide some degree of cooling without damaging the compressor.

In the situation where the thermostat 30 is calling for low capacity "Y1" first stage cooling, and the outdoor unit controller 24 senses via the current level that the mid-capacity solenoid 92 of the scroll compressor is not functioning, the outside unit controller 24 will switch the compressor to full capacity operation and communicate a low capacity compressor lock-out fault via the network 48 to the indoor blower controller 28. The indoor blower controller 28 may respond by requesting the blower motor controller 38 to operate the blower motor 36 at full speed to correspond with the full capacity compressor operation, regardless of whether the thermostat 30 is calling for low capacity "Y1" first stage cooling. The outdoor and indoor unit controllers 24 and 28 would continue to operate in only high capacity mode until the low-capacity compressor lock-out fault signal is removed.

Where the outdoor unit controller 24 is used in a heat pump application, the outdoor unit controller 24 may also monitor current of the compressor motor 42 and the outdoor coil temperature to control defrost operation of the compressor. Specifically, an outdoor coil temperature may provide an indication that frost is building up on the condenser coil. The outdoor unit controller 24 can also sense frost build up by monitoring the current in the compressor motor 42, which steadily decreases as the load is hampered by the buildup of frost on the condenser coil. When the compressor motor current decreases by a predetermined amount, the outdoor unit controller 24 can ascertain when to initiate a defrost cycle, in conjunction with or without the temperature value of the outdoor coil. However, a condenser coil temperature sensor is not able to detect the presence of frost across the entire outdoor condenser coil, which may comprise multiple flow circuits. If any portion of the coil still has residual frost, the single coil temperature sensor may not be able to detect the presence of residual frost. When frost has accumulated across the entire outdoor condenser coil, airflow becomes restricted and the current of the condenser fan motor 40 increases as a result of the restriction. Thus, the current of the condenser fan motor 40 may be a better predictor for defrost cycle control, and may be monitored to determine when to either initiate or terminate a defrost cycle. The current of the compressor motor 42 will increase quickly during defrost of the condenser coil, and may also be used in conjunction with the current of the condenser fan motor 40 to determine when to either initiate or terminate a defrost cycle.

In yet another situation, the outdoor unit controller 24 may also monitor the compressor motor current at 72, 74, and 76, and the discharge line temperature (DLT) to determine if a low refrigerant charge condition is present. If the outdoor unit controller 24 senses a high relative compressor motor current and a high relative DLT rise immediately after starting the compressor motor 42, the outdoor unit controller 24 would communicate a possible low refrigerant charge condition via the network 48 to the other system controllers 28, 30 and 38.

The processor 60 of the outdoor unit controller 24 may further be adapted to continuously obtain the sensed line voltage 66, 68 and the sensed current levels at 72, 74, and 78 of the compressor motor 42 and condenser fan motor 40 during the operation of theses components. By obtaining this data from the line voltage and motor current sensors, the processor of the outdoor unit controller can compute the apparent power during the run time of the outdoor unit 22, and maintain a running KVA total of the power consumed by the outdoor unit 22. This information may be periodically communicated via the network 48 to other controllers in the system such as a thermostat 30 connected to the network 48. The thermostat 30 could accordingly report the month-to-date estimated energy consumed, or utility costs, to the occupant or user of the thermostat 30. The processor 60 of the outdoor unit controller 24 may also periodically communicate the outside ambient temperature sensed at 84 via the network 48 to other controllers such as the thermostat 30, for example. The thermostat 30 could accordingly adjust its temperature set point based on the ambient temperature sensed at 84 to improve the economic operation of the HVAC system.

In a second embodiment of an interactive controller, an indoor air handler/circulator blower controller 28 is provided that comprises a processor 100 and at least one output signal 102 which will request the blower motor controller 38 to operate at a low speed corresponding to "Y1" first stage cooling operation or at a high speed corresponding to "Y2" second stage cooling operation. The indoor air handler/blower controller 28 includes a low voltage power supply that is preferably a half wave regulated power supply (not shown) comprising a diode in series with a transistor and a regulating capacitor and zener diode for gating the transistor. The power supply may also be a small transformer and zener diode circuit. The low voltage power supply powers the processor 100, which includes a plurality of Analog to Digital data inputs for receiving information from various data inputs in connection with the indoor blower controller 28. An example of such an indoor blower controller 28 is a 49B Series Control manufactured by White-Rodgers, a Division of Emerson Electric Co.

The indoor air handler/blower controller 28 may either receive a call for cool from a thermostat 30 via a conventional 24 volt "Y1" first stage cooling signal or a full capacity "Y2" second stage cooling signal, or may alternately receive a first or second stage cooling signal via the network where thermostat 30 is connected to the network 48. When receiving a request for low capacity first stage cooling from the thermostat 30, the processor 100 of the indoor air handler/blower controller 28 communicates a pulsed-width-modulating signal via 108 requesting low speed operation to a variable speed blower motor controller 38. The processor 110 of the indoor air handler/blower motor controller 38 receives the signal and responsively controls an inverter driver circuit 96 to establish low speed operation of the blower motor 36. When receiving a request for low capacity "Y1" first stage cooling from the thermostat 30, the indoor air handler/blower controller 28 communicates a high speed signal via 108 to the processor 110 of the blower motor controller 38. The processor 100 of the indoor air handler/blower controller 28 may also receive information input from a return air temperature sensor and a supply air temperature sensor, or from temperature sensors across the evaporator or A-coil. If the blower motor controller 38 communicates a blower motor failure via the network 48, the indoor blower controller 28 and outdoor unit controller 24 will respond by discontinuing the operation to protect the compressor and or other components from possible damage. Similarly, in the situation where the thermostat 30 is calling for high capacity "Y2" second stage cooling and the blower motor controller 38 communicates a high speed blower motor fault due to an overheated inverter 96, the indoor air handler/blower controller 28 will request the blower motor controller 38 to switch the blower motor 36 to low speed blower operation and communicate a high speed motor blower fault via the network 48 to the outdoor unit controller 24. The outdoor unit controller 24 will respond by switching the relay 94 for actuating the mid-capacity solenoid 94 to operate the compressor at a reduced capacity to correspond to the reduced speed of the indoor blower motor 36, regardless of whether the thermostat 30 is calling to high capacity "Y2" second stage cooling. This provides for a limp-along mode that will still provide some degree of cooling, while running the compressor at a capacity corresponding to the indoor blower motor 36 to provide safe operation for the compressor. The indoor air handler/blower controller 28 and the outdoor unit controller 24 may also communicate to each other information that may be used to verify whether a condition with the outdoor unit 22 and a condition with the indoor blower unit 26 confirm a diagnostic problem in the HVAC system. For example, upon receiving a communication from the outdoor unit controller 24 of a possible loss of charge fault, the indoor air handler/blower controller 28 will determine the sensed temperatures across the A-coil and compare the temperature difference to a predetermined delta to evaluate whether the difference is out of range. If the temperature difference across the A-coil is below the predetermined delta, the indoor air handler/blower controller 28 may communicate the out of range temperature across the A-coil via the network 48, which would confirm that the refrigerant charge is low. This information communicated via the network 48 may be received by a thermostat 30 connected to the network 48, which could then notify the occupant or and outside location 50 of the low refrigerant charge condition.

In the second embodiment of an interactive controller, an indoor air handler/blower motor controller 38 comprising a processor 110 and an inverter driver 96 for a variable speed blower motor 36 is provided. The blower motor controller 38 may receive a request from either an indoor air handler/blower controller 28 or a furnace controller 34 to establish any desired speed of the blower motor 36, within a predetermined operating range. The blower motor controller 38 includes a low voltage power supply that is preferably a half wave regulated power supply (not shown) comprising a diode in series with a transistor and a regulating capacitor and zener diode for gating the transistor. The power supply may also be a small transformer and zener diode circuit. The low voltage power supply powers the processor 110, which includes a plurality of Analog to Digital data inputs for receiving information from various data inputs in connection with the blower motor controller 38.

The blower motor controller 38 further comprises sensors for sensing the voltage to the inverter driver circuit 96, the motor speed, and the temperature of the inverter drive circuit 96. The blower motor controller preferably includes a power module in connection with line voltage, that generates 170 volts DC for the inverter driver 96, with provides three sine wave outputs to the blower motor 36. The blower motor controller 38 is capable of sensing an over-temperature condition in the blower motor 36 or the inverter 96, and responsively reducing the speed of the blower motor 36 to protect the blower motor windings. The blower motor controller 38 then communicates a reduced speed due to an overheating condition to the other system controllers via the network. The indoor blower will respond to this communication by requesting the blower motor controller 38 to switch the motor to low speed blower operation, and communicate a high speed motor blower fault via the network to the outdoor unit controller 24. The outdoor unit controller 24 will respond by switching the relay 94 for actuating the mid-capacity solenoid 92 to operate the compressor at a reduced capacity to correspond to the reduced speed of the indoor blower motor 36, regardless of whether the thermostat 30 is calling to high capacity "Y2" second stage cooling. This provides for a limp-along mode that will still provide some degree of cooling, while running the compressor at a capacity corresponding to the indoor blower to provide safe operation for the compressor.

Where the blower motor controller 38 experiences an overheating condition and responsively reduces the blower motor speed during a call for high stage heating, the blower motor controller 38 communicates the reduced blower speed condition via the network 48 to the furnace controller 34. The furnace controller 34 responds to this communication by responsively switching the operation of the furnace from high stage "W1" operation to low stage "W2" operation, regardless of whether the thermostat 30 is calling for "W1" high stage heating. The furnace controller 34 in this preferred embodiment comprises a processor 124 for controlling the switching of line voltage to the igniter 118, the switching of low voltage to a gas valve relay 120, and low voltage to a second stage gas valve relay 122. In the event the blower motor controller 38 communicates a reduced blower motor speed, the furnace controller 34 will request the blower motor controller 38 to establish the low speed blower motor operation corresponding to the "W2" low heating stage, and communicate a lock-out of high stage heating via the network 48 to the thermostat 30. If the thermostat 30 is connected to the communication network 48, the thermostat 30 may respond to the high stage heating lock-out communicated by the furnace controller 34 by only calling for low stage heating "W1", and by notifying the occupant or an outside location 50 of the high speed blower motor fault. The blower motor controller 38 may also communicate the line voltage value at 114 via the network 48 to the furnace controller 34 for a fuel-fired furnace, which may use the line voltage value at 114 in determining a routine for switching line voltage at 116 to a hot surface igniter 118 for igniting gas, for more accurately controlling the power level to the hot surface igniter. This communication of line voltage information to the furnace controller 34 for a fuel fired furnace improves the life of the hot surface igniter.

In the second embodiment of the present invention, the indoor air handler/blower controller 28 comprises a processor 100 for controlling at least one switching relay 102 for controlling the selection of a plurality of operating speeds of the indoor blower motor 36. The indoor blower controller 28 may either receive a call for cool from a thermostat 30 via a conventional 24 volt "Y1" first stage cooling signal or a full capacity "Y2" second stage cooling signal, or may alternately receive a first or second stage cooling signals via the network 48 where thermostat 30 is connected to the network. The processor 100 of the indoor blower controller 28 may also receive sensed return air temperature and supply air temperature from temperature sensors 104 and 106 across the A-coil and/or heat exchanger. The processor 100 of the indoor blower controller 28 may also receive the sensed temperatures at the inlet and outlet of the a-coil. In one embodiment of the present invention, the indoor blower controller 28 may be configured for use with a multi-speed blower motor 36 that is directly switched via at least one relay 102 by the indoor blower controller 28. The indoor blower controller 28 is capable of determining a malfunction in either the high speed operation or low speed operation of the motor corresponding to the first and second stage operation of the compressor. In the event that a malfunction occurs in the high speed operation or low speed operation, or both, the indoor blower controller 28 communicates the malfunction via the network to the other system controllers 24, 30, 34 and 38. If the indoor blower controller 28 communicates a complete blower motor failure, the outdoor unit controller 24 will respond by discontinuing the operation of the outdoor unit 22 to protect the compressor from possible damage. Similarly, in the situation where the thermostat 30 is calling for high capacity "Y2" second stage cooling and the indoor unit senses a high speed blower motor failure, the indoor blower will switch the blower motor 36 to low speed blower operation and communicate a high speed motor blower fault via the network 48 to the outdoor unit controller 24. The outdoor unit controller 24 will respond by switching the relay 94 for actuating the mid-capacity solenoid 92 to operate the compressor at a reduced capacity to correspond to the reduced indoor blower motor speed, regardless of whether the thermostat 30 is calling to high capacity "Y2" second stage cooling. This provides for a limp-along mode that will still provide some degree of cooling, while running the compressor at a capacity corresponding to the reduced speed of the indoor blower motor 36 to provide safe operation for the compressor. If the thermostat 30 is connected to the communication network 48, the thermostat 30 may respond to the high speed blower motor fault communicated by the indoor blower controller 28 by only calling for low capacity "Y1" second stage cooling, and by notifying the occupant or an outside location 50 of the high speed blower motor fault. The indoor blower controller 28 and the outdoor unit controller 24 may also communicate to each other to information that may verify whether a condition with the outdoor unit 22 and a condition with the indoor blower 26 confirm a diagnostic problem in the HVAC system. For example, upon receiving a communication from the outdoor unit controller 24 of a possible loss of charge fault, the indoor blower controller 28 will determine the sensed temperatures across the A-coil and compare the temperature difference to a predetermined delta to evaluate whether the difference is out of range. If the temperature difference across the A-coil is below the predetermined delta, the indoor blower controller 28 may communicate the out of range temperature across the A-coil via the network 48, which would confirm that the refrigerant charge is low. This information communicated via the network 48 may be received by a thermostat 30 connected to the network 48, which could then notify the occupant or and outside location 50 of the low refrigerant charge condition.

In the various embodiments of interactive controllers, each of the various controllers 24, 28, 30, 34 and 38 also initially establish a base value for various operating parameters relating to each of the controllers and corresponding components. For example, the blower motor controller 38 may establish a base value for the line voltage and speed of the blower motor 36, and calculate a base Cubic Feet per Minute (CFM) of the blower motor 36. When a predetermined reduction in calculated CFM occurs (indicating a dirty air filter), the blower motor controller 38 may communicate a dirty or clogged air filter condition via the network 48 to the thermostat 30, which may responsively notify the occupant or an outside location 50 of the dirty filter condition. In another situation, a baseline curve of the compressor discharge pressure versus the compressor motor current relative to the ambient temperature could be obtained. Any subsequent variation from the curve relationship between the discharge pressure and compressor motor current values could be used to indicate a fault or to predict degradation and potential failure of the compressor. Likewise, the outdoor unit controller 24 may establish a base value for the DLT 86 and the sensed current at 72, 74 and 76 for the compressor motor 42 relative to the sensed outside ambient temperature at 84. When the DLT at 86 and the compressor motor current rise significantly above the relative base line values, the outside controller 24 responsively communicates a possible low charge condition via the network 48 to the thermostat 30. The thermostat 30 may then notify the occupant or and outside location of the possible low charge condition.

In one embodiment of an interactive system for controlling a climate control system, an interactive thermostat controller 30 is preferably connected to the network 48 and is capable of receiving diagnostic and fault information communicated from the various controllers 24, 28, 24 and 38 in the HVAC system. It should be noted, however, that the interactive system is also capable of operating with conventional thermostats that are not capable of being connected to the network 48. The thermostat 30 preferably comprises an initial set-up mode that will prompt scheduled operation periods of all of the various controllers and components upon installation, to speed the process of obtaining base line parameter information for the various controllers and components within the system. For example, the thermostat 30 could detect the installation or connection of a compressor via the network 48, and enter a learn mode that initiates scheduled operation of the compressor during the day and night, to quickly obtain a baseline curve of the motor current relative to outside ambient temperature. The thermostat 30 of the present invention is preferably controlled by a processor 128 and is connected to the peer-to-peer network 48 via an RS-485 connection for communicating to the other system controllers 24, 28, 34 and 38 in the HVAC system. The thermostat 30 may further comprise a wireless transmitter and receiver, for receiving transmitted temperature information from a plurality of temperature sensors 54 for a plurality of zones within the space. The thermostat 30 may further comprise a communication board (not shown) in the sub-base of the thermostat 30 that is adapted to provide a gateway connection to an external ModBus communication link 52. The thermostat may receive requests through the ModBus network at an external location 50 to transmit specific parameter information, upon which the thermostat 30 may prompt the various controllers to obtain parameter information for communication to the external location 50. This parameter information can be monitored by an operation monitoring service provider that may predict the possible failure of various components in the system based in degradation in parameter values. One example of an outside monitoring service provider that utilizes a ModBus network is the Emerson Retail Services group which similarly monitors the operation of commercial refrigerator cases.

The thermostat 30 may be configured to receive diagnostic information or fault signals communicated via the network 48, and to display the diagnostic information or fault signal on a display means to alert the occupant. This fault signal may be an icon that flashes, for example synchronously with the signal received from the network 48. The thermostat 30 may also be configured to respond to a fault signal with a standard message such as "FAULT" or "NEEDS SERVICE" that flashes, for example, synchronously with the signal received from the network 48. The fault signal may also be an error code or text message specific to the indoor blower controller 28 or the outdoor unit controller 24. An example of a parameter that may be monitored is the flame signal obtained from a flame probe within a fuel-fired furnace, which the furnace controller 34 could communicate via the network through the thermostat 30. The service provider would then be able to service the flame probe sensor before the furnace controller 38 shut down the furnace operation.

Another example of parameters the thermostat 30 may monitor include the rate of temperature change in each of the zones within the space, which may be compared to an initial baseline rate of temperature change. Over time, the cooling system may experience a gradual reduction in capacity that results in a reduced rate of temperature change for the space. The thermostat 30 may accordingly sense when the rate of temperature change decreases below a predetermined optimum baseline rate of temperature change. The thermostat 30 may compare this data with data received from the outdoor unit controller 24 concerning high motor current and high discharge line temperature indicative of a possible low refrigerant charge. Likewise, the thermostat 30 may also obtain data from the indoor blower unit controller 28 concerning a below normal temperature delta across the A-coil indicating a low refrigerant charge. This comparison of data at various communication nodes provides confirming diagnostics that strengthen predictions of system maintenance and diagnosis. The above situation of a low refrigerant charge could provide notification to a home owner of an inefficiency that often is unnoticed and overlooked. The thermostat 30 could provide notice to the homeowner, who could then service the system and reduce energy costs.

Some embodiments of an interactive HVAC system may further comprise a plurality of zone dampers 56 for controlling the supply of conditioned air to the one or more zones within the space. Either the thermostat 30, or a damper controller, are capable of opening or closing individual zone dampers 56 in response to the temperature sensed by the remote temperature sensors 54 in each zone, to provide conditioned air from the indoor air blower 36 to each zone requiring heating or cooling. The plurality of zone dampers 56 are also preferably connected to the network 48. In response to a signal from the outdoor unit controller 24 via the network 48 of a reduced capacity operation malfunction (resulting in full capacity operation of the compressor 42 and indoor blower motor 36), the thermostat 30 responsively would communicate a request signal to open each zone damper to correspond to a full capacity operation mode. Likewise, in response to a signal from the outdoor unit controller 24 via the network 48 of a full capacity operation malfunction (resulting in reduced capacity operation of the compressor 42 and indoor blower motor 36), the thermostat 30 responsively would communicate a request signals to open only a minimum number of dampers to correspond to the reduced capacity operation mode.

In addition to the above thermostat 30, or where the interactive system operates with a conventional thermostat that is not connected to the network 48, a separate interface controller (not shown) may be connected to the network 48 for providing communication between the various controllers and a user or outside location 50. The separate interface controller would be capable of providing the same gateway connection to an external ModBus communication link as in the afore described thermostat embodiment, and may also comprise an interface and display means for user access of system information. The interface controller therefore would allow a user or service technician to obtain diagnostic information and operating parameters relating to the HVAC system components, and would also provide for communication of diagnostic information to an outside location 50 such as a monitoring service provider. The interface controller would be able to receive information from the various indoor and outdoor unit controllers to provide confirming diagnostics for predicting potential component failure or required servicing, and communicate such information to the user, service technician, or an outside party.

Thus, various embodiments of an interactive system for controlling a plurality of HVAC components may comprise one or more controllers for controlling one or more components of the HVAC system. Some embodiments comprise at least one controller for operating a component of the HVAC system, where the controller is capable of modifying the operation of the component in response to information received about the operation of at least one component of the HVAC system. It should be noted that the information pertaining to the operation of at least one component of the HVAC system may include temperature information from a remote temperature sensor component that is connected to the network. The information pertaining to the operation of at least one component may include sensed carbon monoxide level information from a carbon monoxide sensor component that is connected to the network. The information pertaining to the operation of at least one component may also include sensed discharge line temperature (refrigerant temperature at the compressor) that is detected and communicated by an interactive controller for an outdoor air conditioning compressor unit. Accordingly, the interactive controllers may modify the operation of at least one component under their control in response to monitoring various types of information pertaining to the operation of a sensor, component, or another interactive controller. The table below illustrates how various embodiments of an interactive system can comprise a combination of controllers, which controllers control certain components (indicated by C) and may modify the operation of its respective components in response to information received about the operation of other components (indicated by I) of the HVAC system.

TABLE 2

| Controller | Compressor (multi-stage) | Condenser fan (multi-speed) | Outdoor sensors | Indoor A-coil temperature | Blower motor (multi-speed) | Furnace (multi-stage) | Zone dampers | Zone temperature sensors | ModBus network or gateway |
|---|---|---|---|---|---|---|---|---|---|
| Damper controller | | | | | | | I | C | I | I |
| Outdoor unit controller | C | C | I | I | I | | | | I |
| Indoor blower controller | I | I | | | C | I | I | | I |
| Blower motor controller | I | I | | I | C | I | I | | I |
| Furnace controller | X | X | X | X | C/I | C | I | | I |
| Thermostat control | C/I | C/I | I | I | C/I | C/I | C/I | I | I |

Some embodiments of an interactive system may also comprise a Personal Digital Assistant, PALM, or a computer or hand held device 134 may also be connected to the peer-to-peer network, for receiving operating information relating to the various controllers and components in the HVAC system. Such a device could be connected to the RS-485 network by a service technician during installation or servicing for troubleshooting and diagnosing the various components in the HVAC system. The hand held device 134 or computer could request parameter information and display the values of various sensors associated with the controllers connected to the network within the HVAC system, and display the information for the service technician. Such a device could include a hand held palm, which could be easily connected and programmed to receive and parse the information being communicated between the various HVAC controllers. It should also be noted that some of the components of the HVAC system may also communicate wirelessly with the network through the use of a transceiver unit in connection with the peer-to-peer network.

In a third embodiment of an interactive controller, an alternate variation of an interactive controller 24' is provided for an outdoor air conditioning compressor unit, which comprises a processor 60 and a means for communicating with a compressor diagnostic unit associated with the compressor. The compressor diagnostic unit (not shown) comprises current sensing means and voltage sensing means for sensing the level of line voltage as well as the current in the run windings and the start windings of the compressor motor 42. The interactive controller 24' of the third embodiment comprises relays (62 or 64) for switching power to the compressor motor 42, and receives current and voltage information from the compressor diagnostic unit rather than directly monitoring the current to the compressor motor 42. The compressor diagnostic unit passively monitors the current in the compressor motor 42 and communicates compressor diagnostic information to the interactive controller 24' for the outdoor unit or directly to the thermostat 30. This third embodiment of an interactive controller 24' can communicate much of the same diagnostic information and faults as described in the first embodiment of an interactive controller, to provide diagnostic information to other components on the network 48 such as the thermostat 30. The interactive controller 24' may also switch compressor operation from high capacity to the mid-capacity level, based on information received from the compressor diagnostic unit. The compressor diagnostic unit may also communicate compressor operating parameters and diagnostic information directly to the thermostat 30, which may responsively control cooling request signals for activating the compressor motor 42 and condenser fan motor 40. The thermostat 30 is therefore capable of initiating or activating the compressor motor 42 and the compressor fan motor 40, based on the information received from the compressor diagnostic unit or the interactive controller 24'. The thermostat 30 may further request full capacity operation or less than full capacity operation, based on information communicated by the compressor diagnostic unit or the interactive controller 24'. An example of a thermostat 30 that may receive direct communication from a compressor diagnostic unit is disclosed in U.S. patent application Ser. No. 10/750,113 entitled "Thermostat for use with compressor health indicator", which is incorporated herein by reference. An example of a compressor diagnostic unit that may sense compressor operating parameters is disclosed in U.S. patent application Ser. No. 10/625,979 entitled "Compressor Diagnostic System For Communicating With An Intelligent Device, which is incorporated herein by reference. The compressor diagnostic unit may also communicate a high side pressure fault condition, which may be sensed by either a pressure sensor 88 or by the compressor motor current. For example, the compressor diagnostic unit may sense a compressor motor current that may indirectly indicate a compressor high side refrigerant pressure, and may respond by communicating this high side pressure fault to either the outdoor unit controller 24' or the thermostat 30. The thermostat 30 may respond by subsequently providing a request signal for high capacity of "Y2" second stage, rather than a request signal for low capacity operation of "Y1" first stage. The thermostat 30 may accordingly perform the switching of the compressor operation from high capacity to the mid-capacity level based on information received from the compressor diagnostic unit. Thus, this second embodiment of an outdoor unit controller 24' provides for passive control of the compressor, through the interactive communication with a compressor diagnostic unit of various operating parameters and faults to the thermostat 30 or the interactive controller 24'.

In another aspect of the present disclosure, various embodiments of an interactive system are provided that have interactive controllers configured to monitor or listen to signals communicated via the two-wire network, which signals are address to or intended for a device other than the controller that is monitoring or listening to the signal. Some embodiments of an interactive system further include at least one controller that is capable of modifying the operation of at least one component that the at least one controller has control over, in response to receiving a signal that is intended for another controller which includes information about the operation of a component within the climate control system.

It should be noted that the presently discloses means for communicating signals within an HVAC system is a significant departure from conventional thermostats that include several wires connected to various HVAC system controls and components. For example, in a conventional system, heating is activated when the conventional thermostat switches a 24 volt AC power source to supply a 24 volt AC signal to a specific individual wire that is connected to a heating system. Likewise, fan operation is activated when the conventional thermostat switches a 24 volt AC power source to supply a 24 volt AC signal to another specific individual wire that is connected to a blower fan motor or a fan contactor. The conventional thermostat switches a 24 volt AC signal to a specific wire for actuating each individual heating, fan or cooling system component. Accordingly, each wire in connection with a conventional thermostat is connected to a different HVAC system component. In heating system or thermostat replacement situations, wiring installed through the walls to an existing thermostat may not be color coded or distinguished from each other, and can potentially be inadvertently confused or interchanged with each other. This can make installation of a replacement conventional thermostat difficult, and can lead to inadvertent miss-wiring of the thermostat to the wrong HVAC component.

According to one aspect of the present disclosure, various embodiments of an interactive system provide for sending digital signals to an intended destination or address of a specific controller in the system, where the signals are transmitted across a two-wire network in connection with various controllers or system components. The systems in the present disclosure do not require a specific wire to be connected directly from the thermostat to each specific HVAC component, such that the thermostat must transmit a 24 volt signal through a specific individual wire associated with a specific individual HVAC component to activate the HVAC component. Rather, the present systems use only two-wire "bus" network transmission lines for sending signals, to eliminate the need for a dedicated individual wire connecting each specific individual controller to the thermostat. Thus, the various controllers are connected to each other only through the two wire network. In the various embodiments, a thermostat controller 420 may transmit a signal via the two-wire network that includes information identifying the intended destination or address of a specific controller. Where the signal is requesting operation of a specific individual controller, the signal includes a unique command that is specific to only the individual controller that the thermostat is requesting operation of. Thus, the thermostat controller 420 could send a signal that only requests operation for a specific controller, unlike the conventional thermostat that sends a 24 volt AC signal (or half wave rectified 24 volt signal) across an individual wire, which voltage signal could activate any HVAC component that the wire is connected to.

The various embodiments of interactive systems disclosed provide a means of transmitting digital data signals to components and controllers, which signals are not capable of activating or powering an HVAC control or component as would a 24 volt signal (or half wave rectified 24 volt signal). The transmitted digital signals are sent across the two wire bus network in connection with the various HVAC controllers and components, rather that via a specific individual wire used to control activation of an HVAC system component. Unlike conventional systems, where a 24 volt AC waveform or a rectified 24 volt AC waveform may be conducted via a specific individual wire to activate an HVAC control connected to the individual wire, or where a 24 volt AC waveform that powers a control may be half wave rectified to both signal activation of the control and power the control as well, the present means of communication does not transmit a signal via a specific wire connected to an individual HVAC control to "activate" the HVAC control. Rather, the present means transmits a digital signal that will only request operation of a specific HVAC component, by virtue of a command that is unique to the specific controller. This prevents the possibility of tampering that is present in a conventional system, where an individual wire that transmits a 24 volt AC "activation" signal (or half wave rectified signal) could be jumpered or connected to an HVAC control or component to operate the component.

A significant aspect of the present disclosure is that one can tailor or create various embodiments of a "networked" HVAC system, in which a first controller associated with an HVAC component is installed and connected to a two-wire network, and at least one other controller associated with another HVAC component is subsequently or incrementally installed and connected to the network, to provide at least one controller that is capable of monitoring signals from and communicating signals to the at least one other subsequently installed controller for enabling an interactive system without requiring configuration of the individual controllers through a master thermostat.

As an example, a home owner having an existing HVAC system might decide to replace only their worn-out outdoor air-conditioning compressor unit with a new outdoor air-conditioning compressor unit, which includes an interactive controller according to the present disclosure. The interactive controller for the air-conditioning compressor unit is initially connected to a specific wire that transmits a 24 volt request signal sent by the conventional thermostat, and also to a two-wire network on which the controller periodically transmits data signals. Without detecting any signals from other controllers connected to the network, the interactive controller simply activates the compressor in response to the 24 volt signal sent by the existing conventional thermostat. At a later point in time, the home-owner decides to subsequently replace the old indoor air handler unit with a new air handler unit including an interactive controller. The interactive controller associated with the new air handler is incrementally connected to the network, and is capable of monitoring signals from and communicating signals to the interactive controller for the outdoor air-conditioning compressor unit. Accordingly, each of the two interactive controllers are subsequently capable of monitor signals sent by the other, and also capable of modifying the operation or operating capacity of their respective units in response to receiving a signal that includes information about an operating parameter of at least one HVAC component. The interactive response of the controllers may be illustrated by the following situation. The conventional thermostat sends a 24 volt signal to the interactive controller for the outdoor air conditioner unit, which would responsively activate or operate the outdoor compressor. The interactive controller for the outdoor air conditioner unit may responsively send a signal via the network communicating the activation of the outdoor compressor (which signal would be addressed to an interactive thermostat that is not installed). The interactive controller for the air handler may monitor the signal indicating compressor operation (which is intended for an interactive thermostat that is not installed), and responsively operate the indoor air circulator blower regardless of whether the conventional thermostat sends a 24 signal to the air handler controller. In this manner, the interactive controller for the indoor air handler need not be connected to a specific wire associated with the conventional thermostat, or to a "master-slave" control thermostat. Thus, unlike master-slave HVAC networks that first require the installation of a master thermostat for coordinating communication between subordinate controllers, the preceding exemplary embodiment allows a home owner to create an HVAC network by incrementally adding new interactive controllers one at a time, without having to purchase or install a master thermostat or to configure the individual controllers. Accordingly, the preceding exemplary embodiment enables interactive control of one or more HVAC system components, without requiring a "master" control thermostat, or having to configure each of the individual controllers to communicate with or to be controlled by a master thermostat.

Furthermore, the preceding exemplary embodiment of an interactive system provides for intelligent control of the outdoor air conditioner compressor and indoor air handler units. This may be illustrated by the situation of an over-temperature condition in either the compressor motor or the indoor air circulator blower motor. In the event of an over-temperature condition in the indoor air circulator blower motor, the interactive controller for the indoor air handler unit would discontinue circulator blower motor operation, regardless of whether the conventional thermostat is sending a 24 volt signal requesting air conditioning operation. The interactive controller for the indoor air handler unit would responsively send a signal via the network communicating the discontinued circulator blower motor operation (which signal would be addressed to an interactive thermostat that is not installed). The interactive controller for the outdoor air conditioning compressor unit may monitor the signal indicating discontinued circulator blower motor operation (which is intended for an interactive thermostat that is not installed), and responsively discontinue operation of the compressor, regardless of whether the conventional thermostat sends a 24 signal to the air handler controller. In this manner, the interactive controller for the outdoor compressor unit can protect the compressor from damage as a result from the indoor coil unit freezing up due to in operation of the blower motor. The interactive controller for the indoor air handler will subsequently re-activate the circulator blower motor after enough heat is dissipated to remove the over-temperature condition, and will responsively send a signal via the network communicating the circulator blower motor operation (which signal would be addressed to an interactive thermostat that is not installed). The interactive controller for the outdoor air conditioning compressor unit may monitor the signal indicating circulator blower motor operation and responsively establish operation of the compressor, to provide a limp along mode of air conditioning until the over-temperature condition is corrected while protecting the compressor motor from damage. Thus, the interactive controllers are capable of modifying the operating capacity of at least one climate control system component in response to receiving a signal that includes information about an operating parameter of at least one other component in the climate control system, without requiring the installation of a master-slave type thermostat.

In the preceding exemplary embodiment, a carbon monoxide detector may also be installed and connected to the network. In the event that the carbon monoxide detector senses an undesirable level of carbon monoxide, the sensor may sound an alarm and may be configured to send a signal via the network (which signal would be addressed to an interactive thermostat that is not installed). The interactive controller for the indoor air handler unit is capable of monitoring the sensor's signal and may be configured to responsively activate the air circulator blower to help dissipate the presence of carbon monoxide gas. Accordingly, the interactive controller for the indoor air handler unit is capable of modifying the operation of at least one climate control system component in response to receiving a signal that includes information about an operating parameter of at least one other component in the climate control system, without requiring the installation or use of a master-slave type thermostat or any set-up and configuration of the network using a master-slave device.

In a master/slave network system, a single central controller determines when other sub-devices connected to the network may transmit. In systems employing a master/slave network, a network of devices must be configured through the master controller to assign an address to each of the installed sub-devices to enable the sub-devices to communicate via the network. If an HVAC system were to employ a "master" thermostat, the master thermostat would control when the other sub-controllers could communicate via the network. Accordingly, sub-controllers would only communicate information in response to a query or request from a "master" thermostat, which would serve as the receiver of all information and initiator of all operational commands for the various sub-controllers for directly controlling the operation of each controller. Unlike the "master" thermostat approach, the various embodiments in the present disclosure comprise controllers that are configured to freely transmit signals via the network to any other controller, independent of any control by a "master" thermostat or setup of network addresses through a "master" thermostat. The controllers of the present disclosure are also capable of monitoring signals addressed to or intended for other controllers, and responsively modifying the operation of a component under their control, independent of any control by a "master" thermostat. Thus, the interactive systems and controllers of the present application are significantly different from Server/Client networks used in large commercial buildings to control HVAC systems, or HVAC systems that utilize a central "master" thermostat that controls or dictates when sub-controllers can communicate information or modify operation of an HVAC component.

Accordingly, various embodiments of an interactive system having a first controller and at least one other controller are provided for enabling interactive communication in a climate control system, to improve control of climate control system's operation. In the various embodiments, an interactive system is provided that comprises a two-wire network, and at least two controllers configured to transmit and receive signals via the two-wire network absent any control by a master controller. Each controller is capable of listening to signals sent by other controllers via the network that are addressed to other controllers and include information about the operation of at least one component in the climate control system, and responsively modifying the operation of at least one component of the climate control system that the controller has control over based on the information about the operation of at least one component in the climate control system.

In the preceding exemplary embodiment, the home owner may subsequently purchase and install an interactive thermostat controller, which may be connected to the two-wire network. The interactive thermostat would be capable of receiving sensed temperature information from remote sensors to determine when to request heating or cooling operation. The interactive thermostat controller would then be capable of communicating signals intended for specific interactive controllers, which signals may request operation of a component of a climate control system that the interactive controllers are associated with. For example, the interactive controller for the outdoor air conditioning compressor unit would be capable of receiving a signal via the network from the interactive thermostat controller, which requests the interactive controller for the outdoor air conditioner unit to operate the compressor. Likewise, the interactive controller for the indoor air handler unit would be capable of receiving a signal via the network from the interactive thermostat controller, which requests the interactive controller for the indoor air handler to operate the air circulator blower motor. In the event that the interactive controller for the indoor air handler unit discontinues blower operation and sends a signal via the network addressed to the interactive thermostat communicating the discontinued circulator blower motor operation, the interactive thermostat would be capable of receiving the signal and at least displaying information pertaining to the discontinued blower operation on a display device of the thermostat. The interactive controller for the outdoor air conditioning compressor unit would also monitor the signal intended for the interactive thermostat indicating discontinued circulator blower motor operation, and would responsively discontinue compressor operation as well, independent of any direct command or control by the thermostat. Thus, the preceding exemplary system can use a thermostat while allowing interactive communication between and operational control by each of the controllers.

In the various embodiments of interactive controllers, the interactive controllers may be configured for controlling operation of various components in a desired manner. For example, an interactive controller for an outdoor air conditioning compressor unit may be configured to have a desired lock-out time between compress stop and start-up, which may be selected from a number of pre-select time periods. Likewise, an interactive controller for an outdoor air conditioning compressor unit may be configured to have a desired number of motor protector trips before locking out further operation of the compressor (to protect the compressor), which number may be selected from a number of pre-select time periods. Similarly, an interactive controller for an indoor air handler may have a selectable time delay period for delaying the shut-off of the indoor blower motor after the furnace's burner has stopped, to continue to remove any latent heat from the furnace. The interactive controller for an indoor air handler may be configured to have a desired time delay period, which may be selected from a number of pre-select time periods. Thus, each of the interactive controllers may be configured to select or include certain desired operating features. Each of the controllers may be individually configured by an installer. Alternatively, an installer may utilize a thermostat controller described in the preceding exemplary embodiment, to communicate configuration data via the network through the thermostat to a particular controller. In this manner, the installer may remotely configure desired settings or options that may be selected on the controller for the outdoor air conditioning compressor unit, or on the controller for the indoor air handler unit, without having to go to the location of each of the individual controllers. Thus, while a thermostat controller is not necessary for set up of other controllers and does not control communication by the other controllers, the thermostat controller may be utilized to configure each of the controllers via the network.

Figure 4:
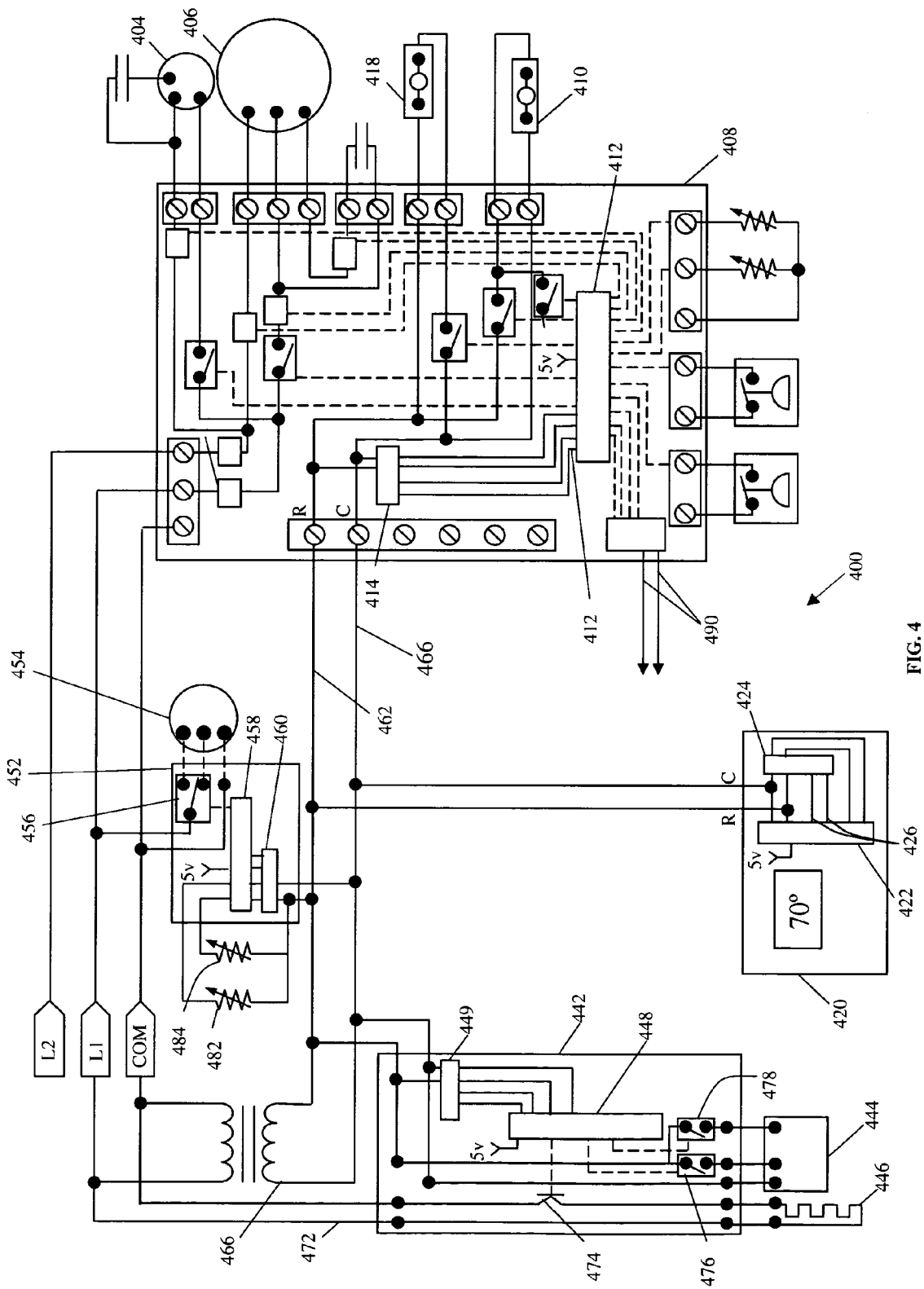
FIG. 4 is a schematic diagram of a fourth embodiment of an interactive HVAC system.

A fourth embodiment of a plurality of interactive controllers that form a system is shown in FIG. 4. The system comprises an integrated furnace controller 442, for controlling the operation of one or more components of the heating system. The integrate furnace controller 442 is capable of modifying the operation of the one or more heating system components it controls, such as a two-stage gas valve, in response to receiving information transmitted via the two-wire "bus" network about the operation of another controller or component within the heating, ventilation, and air conditioning system. The controller for a circulating air blower 428 may, for example, include a variable speed circulator blower motor controller 438 with an inverter driver, which if overheated would reduce the speed of the circulator blower. The blower controller could responsively communicate its reduced speed information by transmitting a signal via the two-wire "bus" network lines. The signal may be intended for a specific controller, such as the thermostat controller 420 or the integrated furnace controller 442. Where the signal is intended for the integrated furnace controller 442, the integrated furnace controller 442 would respond to the blower's reduced speed signal by modifying its operation to that of only low stage heating operation to correspond to the reduced circulator blower speed. The integrated furnace controller 442 would operate in low stage heating mode even though the thermostat controller 420 has requested the integrated furnace controller 442 to operate the furnace at high stage heating. Where the signal includes an address or intended destination of a thermostat controller 420, the integrated furnace controller 442 may still "listen" to the signal intended for the thermostat controller 420, and responsively restrict operation to low stage heating. Likewise, where the furnace shuts off after sensing an over-temperature condition, the furnace controller may signal the blower controller 428 to continue operating until the over-temperature condition is alleviated. Accordingly, a single signal transmission intended for a specific controller that includes information of an operating condition can improve operation of multiple controllers. The integrated furnace controller 442 could, for example, communicate the restriction of its heating operation to the thermostat controller 420, which would alert the occupant of a need for service.

In one aspect of the present invention, some embodiments include one or more interactive controllers for a climate control system, where at least one controller is capable of modifying the operation of one or more system components under its control in response to receiving a signal transmitted by another controller that includes information about the operation of at least one component or controller in the climate control. In the fourth embodiment, the system may comprise at least two controllers for controlling the operation of one or more components of the cooling system. The at least two controllers 408 and 452 can communicate via the two-wire "bus" network lines to provide for operation in either a full capacity mode of operation or a reduced capacity mode of operation, based on the communication by one of the at least two controllers of information relating to the operation or condition of a component under the individual controller's control. For example, if the thermostat controller 420 transmits a signal requesting compressor operation and the indoor air handler/circulating air blower controller 452 is not capable of operating, the indoor air handler controller may detect the blower operation failure (by a pressure sensor, motor current sensor, or temperature sensor for example) and transmit a signal via the two-wire "bus" network lines communicating the failure to another controller. The signal may be intended for a specific controller, such as the thermostat controller 420 or the compressor unit controller 408. Where the signal is intended for the compressor unit controller 408, the compressor unit controller 408 could respond to the information of a blower failure by modifying its operation to shut down the compressor to protect the compressor motor from possible damage due to the indoor coil unit freezing up. The compressor unit controller 408 would shut down even though the thermostat controller 420 is still requesting operation of the compressor. Where the signal includes an address or intended destination of a thermostat controller 420, the compressor unit controller 408 may still "listen" to the signal intended for the thermostat controller 420, and responsively shut down the compressor to protect the compressor. The compressor unit controller 408 could subsequently transmit a signal via the two-wire "bus" network lines that is addressed to the thermostat controller 420, for communicating the shut down of the compressor due to the information on the failed circulator blower, such that the thermostat controller 420 may alert the occupant of a need for service.

In yet another aspect, some embodiments of an interactive system may comprise at least two controllers that communicate information via the two-wire "bus" network lines to provide for controlling operation of one or more system components in either a full capacity mode or a reduced capacity mode of operation based on the communication of information relating to the operation of one of the at least two controllers. For example, in the fourth embodiment, the system comprises at least two controllers that together provide for controlling the operation of a multi-stage air conditioning system in either a high capacity or a low capacity mode. If a first compressor unit controller is not able to continuously operate the compressor in high capacity mode (due to a high discharge line temperature, or high motor current for example), the compressor unit controller could restrict operation to low capacity mode and transmit a signal via the two-wire "bus" network lines communicating the restriction. The signal may be intended for the second controller 452 for an air handler circulating air blower, or for the thermostat controller 420. Where the signal is intended for the circulating air blower controller 452, the circulating air blower controller 452 could receive the signal and responsively reduce the circulator blower speed to correspond to the low capacity compressor mode of operation to allow the air conditioning system to operate in a limp-along mode until the air conditioning system can be serviced. The compressor and circulating air blower would be operated at a low capacity mode even though the thermostat controller 420 is still requesting operation at high capacity. Where the signal includes an address or intended destination of a thermostat controller 420, the circulating air blower controller 452 may still "listen" to the signal intended for the thermostat controller 420, and responsively reduce the circulator blower speed to correspond to the low capacity compressor operation mode.

In yet another aspect of the present disclosure, some embodiments of an interactive system may comprise controllers that include a microprocessor capable of transmitting one or more unique data signals through a UART interface. The microprocessor is configured to communicate a valid start bit followed by subsequent data bits of a signal to be transmitted via the power lines. Referring to Table 3 below, the serial data signal includes one or more data bits, the first data bit of which comprises a destination node or address that the serial data signal is intended to be received at. The serial data signal further comprises a subsequent data bit that includes the sender's node or address, and may further include a subnet node or address. The data signal may further comprise a node type data bit and device request data bit, which permit a controller (such as a thermostat) to take control of the communication transmissions being sent over the two-wire "bus" network lines.

TABLE 3

Message Configuration

| Addressing | | | 3rd Party | Special Function | | Messages | | | Bytes 8- CRC |
|---|---|---|---|---|---|---|---|---|---|
| Byte 0 | Byte 1 | Byte 2 | Byte 3 | Byte 4 | Byte 5 | Byte 6 | Byte 7 | (N–2) | Bytes N |
| Destination Node Address | Sender Address | Subnet | Node Type | Device Request | Payload Config | Message Type | Packet Number | Payload Length | Data Payload | Checksum |
| 8 Bits | 8 Bits | 8 Bits | 8 Bits | 4 Bits | 4 Bits | 8 Bits | 1 Byte | 1 Byte | 1 to 245 bytes | 2 Bytes |
| (0–255) | (1–255) | (0–255) | (0–255) | (0–15) | (0–15) | (0–255) | (0–255) | (0–245) | (1–N) | (0–65535) |

The serial data signal transmitted by the controllers comprises a node type data bit, which permits controllers that are capable of a listen mode to monitor signals transmitted by other controllers, such that one or more listening controllers may modify the operation of their respective HVAC components in response to operating information signals transmitted by other controllers. For example, if an outdoor compressor unit controller communicates a signal indicating that the compressor has been restricted to low capacity operation, the indoor air handler unit controller listening to the signal could respond to the operating information by modifying operating of the circulator blower to a reduced speed that corresponds with the low capacity compressor operation. Node types could include controllers for any of the following number of HVAC components or subsystems listed in Table 4 below.

TABLE 4

Node Types

| Node Type | Node ID |
|---|---|
| Thermostat | 0 |
| Gas Furnace | 1 |
| Air Handler | 2 |
| Unitary Air Conditioner | 3 |
| Unitary Heat Pump | 4 |
| Electric Furnace | 5 |
| Package System (Gas) | 6 |
| Packager System (Electric) | 7 |

TABLE 4-continued

Node Types

| Node Type | Node ID |
|---|---|
| Ceiling fan | 8 |
| Whole house fan | 9 |
| Air Exchanger | 10 |
| Dehumidifier | 11 |
| Electronic Air Cleaner | 12 |
| ERV | 13 |
| Humidifier (Evap) | 14 |
| Humidifier (Steam) | 15 |
| HRV | 16 |
| IAQ Analyzer | 17 |
| Media Air Cleaner | 18 |
| Zone control | 19 |
| Zone master | 20 |
| UV Light | 21 |
| Boiler | 22 |
| Gas Water Heater | 23 |
| Electric Water Heater | 24 |
| Commercial Water Heater | 25 |
| Pool Heater | 26 |
| Bus Interface Module | 27 |
| Gateway | 28 |
| Diagnostic Device | 29 |
| Lighting Control | 30 |
| Security System | 31 |
| Fuel cell | 32 |
| Spare | 33–255 |

In the various embodiments, the controllers monitor the 24 volt waveform conducted via the two-wire "bus" network lines for transmission signals, and are capable of listening to data signals from various transmission sources that are intended for a different destination address (or controller). While a signal may be intended for a given destination address, other controllers may still "listen" to or receive these signals and analyze them depending on the node type of the sender of the signal. The listening mode of the controllers provides for sharing information that reduces the number of signal transmissions by eliminating request signals for information, and also provides for improved diagnostic capability, component safety, fault protection, and occupant safety.

For example, a transmitted signal may includes a source address and node type of a controller for an outdoor air conditioner compressor unit (eg-unitary air conditioner node ID 3) and a destination address of the thermostat, and may communicate diagnostic information of a high Discharge Line Temperature (DLT) upon start up of the compressor, indicating a possible low refrigerant charge that may require servicing. A controller for the indoor air handler may listen to the message from the compressor unit node type, and responsively compare the sensed temperature difference across the indoor A-coil to a predetermined delta to evaluate whether the difference is out of range, which would confirm that the refrigerant charge is low. The indoor air handler controller could then communicate a confirmation of a low refrigerant charge to the thermostat controller, to prompt the thermostat to alert the occupant of the need for servicing of the low charge condition.

In another example, a thermostat controller could transmit a signal to a controller 408 for a compressor of an air conditioning or heat pump system to request operation of the compressor. The controller of the air handler's circulating air blower could "listen" to or receive the signal and responsively check its line voltage level sensing circuitry associated with a variable speed inverter driver for a blower motor, to verify that the line voltage level is not below a threshold value indicative of a brown out condition. If the circulating air blower controller 452 determines that a low line voltage condition exists, the circulating air blower controller 452 could transmit a signal including the low line voltage information to the compressor controller 408, which could responsively discontinue operation to protect the compressor from being damaged by the low voltage condition. This type of interactive communication can accordingly provide component protection against damage for one of more components in the climate control system.

In another example, occupant safety is provided in a situation of a presence of an unsafe level of carbon monoxide. In a climate control system that at least includes a fuel-fired heating system and a thermostat controller in connection with a common and two-wire "bus" network lines, the system may further include a fuel-fired water heater in connection with the two-wire "bus" network lines. A controller for the fuel fired water heater is connected to the two-wire "bus" network lines and is capable of receiving and transmitting signals superimposed onto the low frequency low-voltage waveform. The fuel-fired heating system controller 442 is capable of modifying the operating of the heating system by shutting down, in response to "listening" to a signal transmitted by the water heater controller that is intended for the thermostat controller 420, which includes information about the presence of a harmful level of carbon gas or a presence of flammable vapors. In either case, the furnace or heating system would discontinue operation to help improve the safety of the occupants. Likewise, a carbon monoxide detector could also be configured to provide an indication of a harmful carbon monoxide level which may be communicated through a high frequency signal superimposed onto the low frequency low-voltage waveform to alert the thermostat controller. The heating system controller would be capable of "listening" to or receiving the signal intended for the thermostat which includes information about a harmful carbon monoxide level, and responsively discontinues operation of the heating system.

The usage of node types is one way of receiving data from other devices one the network without having to initiate a request signal for information. The various controllers or subsystem devices can operate in a listen mode to monitor signals transmitted by certain node types to get information from certain subsystem devices or controllers. Alternatively, the controllers can also request transmission of information from other controllers. In order to determine what can be requested from other controllers that are in communication via the two-wire "bus" network, a controller device may transmit a device request to query what types of devices are present.

The serial data signal transmitted by the controllers comprises a device request bit, which enables a controller to request another controller that is currently communicating to allow access, such that the requesting controller may be allowed to communicate a request for specific information from another controller in a peer-to-peer manner. For example, if an outdoor compressor unit controller detects a possible low refrigerant charge condition, the outdoor compressor unit controller could request the indoor air handler controller to communicate specific information relating to whether the sensed temperature difference across the A-coil is out of range, which would confirm that air conditioner refrigerant charge is low. This information may also be communicated to the thermostat to alert an occupant of the low refrigerant charge condition.

In some embodiments, a communication coordinator may be employed in connection with the two-wire "bus" network lines. Where a communication coordinator is used, a controller device may transmit via the two-wire "bus" network lines a request of the coordinator to provide a network configuration request. The request is made after the coordinator makes a periodic request of subordinate device status. This would allow an individual controller to include itself in the network of other controllers identified by the coordinator. Each controller device (or node) may further communicate a request to the communication coordinator (after the coordinator makes a periodic request of subordinate device status) to take control of the communication being sent across the power lines, for enabling the requesting controller to transmit a signal intended for another controller. The coordinator would respond by sending signals to controllers other than the requesting controller to suspend transmission until the next periodic request for status by the coordinator. The requesting controller could then transmit a signal intended for another controller that contains a request for operation, or relevant operating information, for example. In this manner, each controller may communicate to other controllers via the power lines without a likelihood of signal interference, since the transmitting control would have dominant control over the lines.

The serial data signal transmitted by the controllers comprises a payload data configuration byte. The payload configuration bits are used in determining what type of data packet is being received. These bits are located in byte 3 of every data packet sent in bits 0-3. The message type is contained in Byte 5 of the packet, and may provide information as to whether the signal is interrogating or requesting information from another controller or a component, whether the signal is of a sensor data type, whether the signal is a unique command signal intended for a specific controller or component in the system, or whether the signal is an operating informational message intented for a specific controller in the system, such as a thermostat. The message may be a code which other controllers may recognize. The message may also be a text message, as opposed to a fixed-digit code that the thermostat must look up to display a corresponding message to an occupant. In this manner, a controller may provide more specific repair or maintenance information than just a code. Table 5 below outlines some of the message types that may be employed in the various embodiments. It should be noted that any one of a number of controllers communicating via the network may prompt the thermostat to display a variable length text message, as indicated in message type 20. This feature allows for thermostat compatibility with newer version controllers that may be installed or upgraded at a future point in time. Such new controllers could simply send a lengthy asci-text message including detailed diagnostic information to the thermostat, rather than send a diagnostic code number that the thermostat may not have within its memory and would not recognize.

TABLE 5

Message Type.

| Message Type | Message Name | Description |
| --- | --- | --- |
| 0 | Ready | Used to make normally subordinates a coordinator |
| 1 | Status Request | Used to request operating status of a controller |
| 2 | Status Reply | or its respective components |
| 3 | Control Command | Commands a specific controller/component to operate in a desired mode |
| 4 | Configuration Request | Installation Parameter Info used to configure |
| 5 | Configuration Data | controllers and components |
| 6 | Sensor Read Request | Serial communication by any external/internal |
| 7 | Sensor Data | sensors in a subsystem that can be shared with the system |
| 8 | Spare | |
| 9 | Set Address | |
| 10 | Event Request | Request Data defined as historical operating |
| 11 | Event Reply | information of a specific controller or component in the system. |
| 12 | ID Request | Identification Data of individual controllers |
| 13 | ID Set | and components in the system |
| 14 | ID Reply | |
| 15 | Node Type Request | |
| 16 | Node Type Reply | |
| 17 | Message Config Request | Used to determine which messages are applicable |
| 18 | Message Config Reply | per specific component or controller in the system. |
| 19 | Display Control Request | Used to take control of the thermostat display to provide installation/diagnostic/System Checks |
| 20 | Display Control Reply | or any other subsystems needs. (text message may vary in length) |
| 21 | Shared Device Data Request | Installation Specific Configuration Data used for transmitting data to shared networks or external network |

Figure 5:
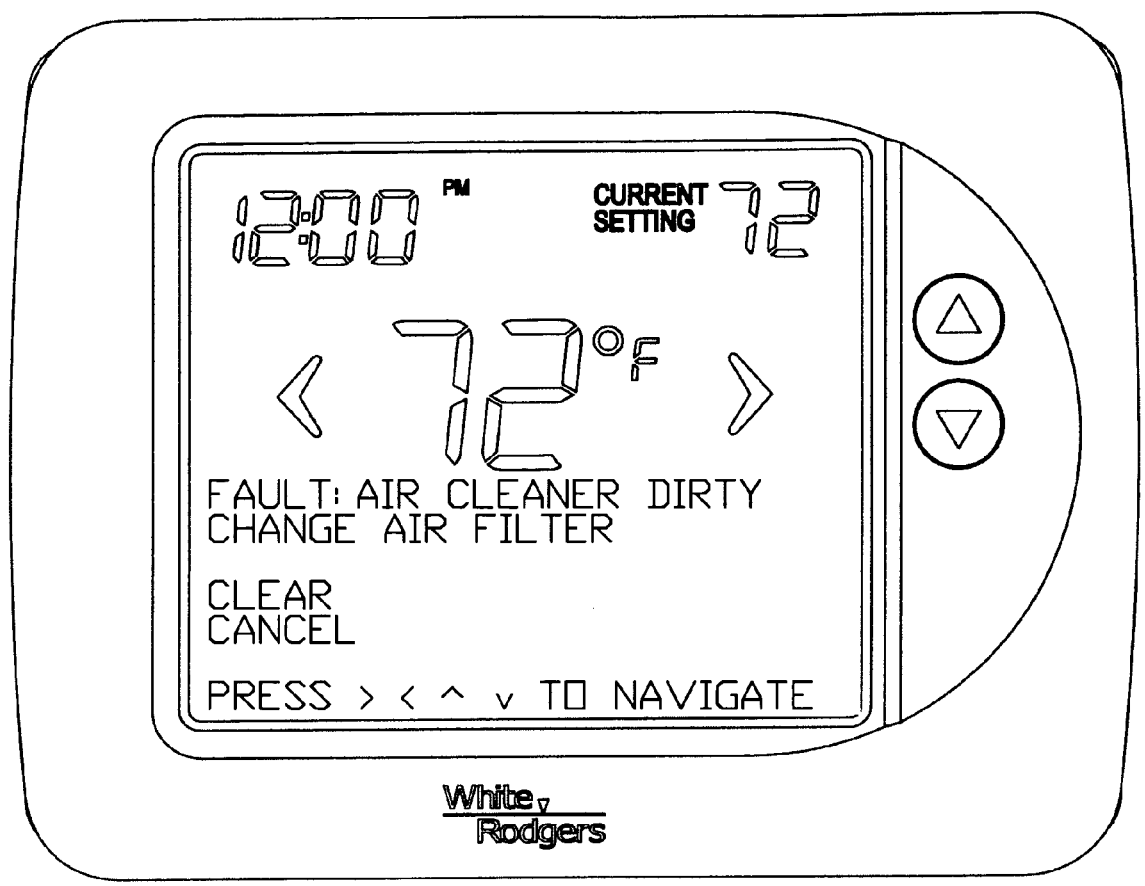
FIG. 5 is a view of one embodiment of a thermostat controller displaying operating information in accordance with the principles of the present invention.
Figure 6:
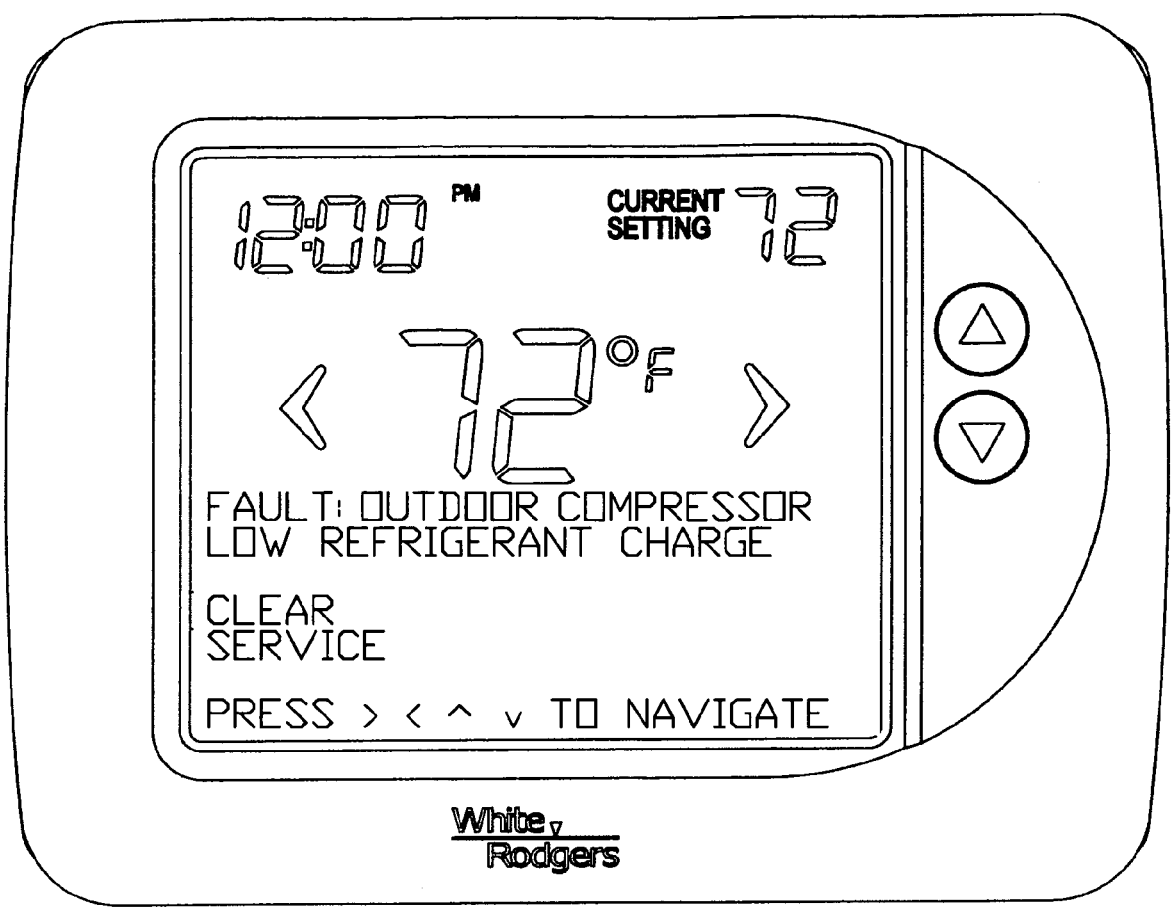
FIG. 6 is a view of the thermostat controller of FIG. 5, displaying operating information in accordance with the principles of the present invention.

The one or more controllers may transmit text messages to a thermostat controller to alert an occupant of specific maintenance requirements, such as a dirty air cleaner in need of filter replacement, or an outdoor compressor with a low refrigerant charge, as shown in FIGS. 5 and 6. The thermostat may be prompted by a transmitting controller to display both a text message and also a "cancel" or "clear" icon. The occupant may accordingly view the message, replace the filter for example, and clear the signal communicating a maintenance requirement. The thermostat may also be prompted by a transmitting controller to display both a text message and a "service" icon. Where a service icon is displayed, the occupant may select the service icon by touching a button, upon which the thermostat may display a text message of a service contractor's name and phone number, which could be customized by a service contractor installing the thermostat controller.

In the various embodiments of an interactive system comprising two or more controllers for controlling a plurality of HVAC components, the controllers may be incrementally installed and connected to the network without requiring the installation of a master thermostat for controlling communication between the controllers. In yet another exemplary embodiment, a home-owner may decide to install a second air conditioning system for a second floor of a home that has an existing air conditioning system including interactive controllers and a thermostat controller in connection with a network. The existing controllers communicate to an existing interactive thermostat controller, which may further be used to control the new second floor air conditioning system controllers. The new controllers for the new air conditioning components and a new temperature sensor associated with the new controllers (for the second floor) are preferably connected to the network. The new temperature sensor subsequently sends signals including temperature information, and the new controllers also send status signals, via the network. Such signals may be addressed to a default thermostat type. The existing thermostat controller would be capable of listening to the signals transmitted by the temperature sensor and the new controllers, regardless of whether the signal is addressed to or intended for the existing thermostat. Upon monitoring a signal from the new controllers and the new temperature sensor, the existing thermostat controller could responsively communicate a signal to the new controllers to modify the operation of the second system, eg. to activate the system. The existing thermostat controller can then monitor the signals transmitted by the new temperature sensor to determine whether the temperature is decreasing in response to its request of the new controllers to establish operation of the second cooling system. Thus, the existing thermostat controller is interactively capable of associating the new controllers and the new temperature sensor, and subsequently controlling the new second air conditioning system via the network.

In the above exemplary embodiment, the existing thermostat controller preferably alerts the user of the detection of a second air conditioning system, by displaying this on the thermostat's display. Accordingly, the existing thermostat controller can allow user of the thermostat to then enter a set-point temperature for each air conditioning system, each of which will control operation of their respective air conditioning system. Thus, the user may control the operation of the new controllers in the second system without knowing their specific node types or addresses.

In the above exemplary embodiment, the existing thermostat controller may optionally, but not necessarily, identify each of the new controllers associated with the second air conditioning system as a sub-node type (see Table 5). The existing thermostat controller may simply assign a node type for each of the new controllers within an internal memory of the thermostat. The thermostat optionally may communicate a signal including a sub-node identification to each of the new controllers that the existing thermostat controller has associated with the new temperature sensor (which new controllers would store the sub-node type). By identifying the new controllers as a particular sub-node type, the existing thermostat controller can then display to the user the sub-node type associated with the new second system controllers. A user or a service repairman would then be able to distinguish controllers of the second system by the displayed sub-node type, such that the user or repairman can select a particular controller within the second air conditioning system to request operational or diagnostic information pertaining to the second air conditioning system (as opposed to information pertaining to the existing air conditioning system. The existing thermostat, by at least internally assigning a sub-node type to the second system controllers (but not necessarily assigning a sub-node address to the individual controllers), would allow the thermostat to function as a user-interface that would allow the user to gain access to the new controllers of the second air conditioning system without having to know their respective addresses or node types. This exemplary system is notably different from "master-slave" thermostat situation, which would not permit the new controllers to communicate via the network to other controllers until each new controller is manually set-up or configured through the master thermostat.

In the above exemplary embodiment, the existing thermostat controller can automatically identify and associate the new controllers of the second air conditioning system as described above, and can further allow a user to utilize the thermostat controller as an interface to gain access to the new controllers of the second air conditioning system for modifying their default settings without having to know their respective addresses or node types. While each of the new controllers of the second air conditioning system may each be modified from their default operating configuration by manually accessing each control at its respective location, the new controllers may also be communicated to via the network through a thermostat controller in connection with the network. For example, a controller for an indoor air handler associated with the second air conditioning system may have a default time delay period in which the circulator blower remains on after discontinuation of compressor operation, which time period may be altered by a user. Rather than the user having to go the location of the specific controller and manually entering a setting, by pressing a button a certain number of times for example, the user may prompt the thermostat to display the settings of a selected controller. The user may then modify or select a different setting, which the thermostat controller would then communicate via the network to the selected controller such that the controller may change its default setting.

Figure 7:
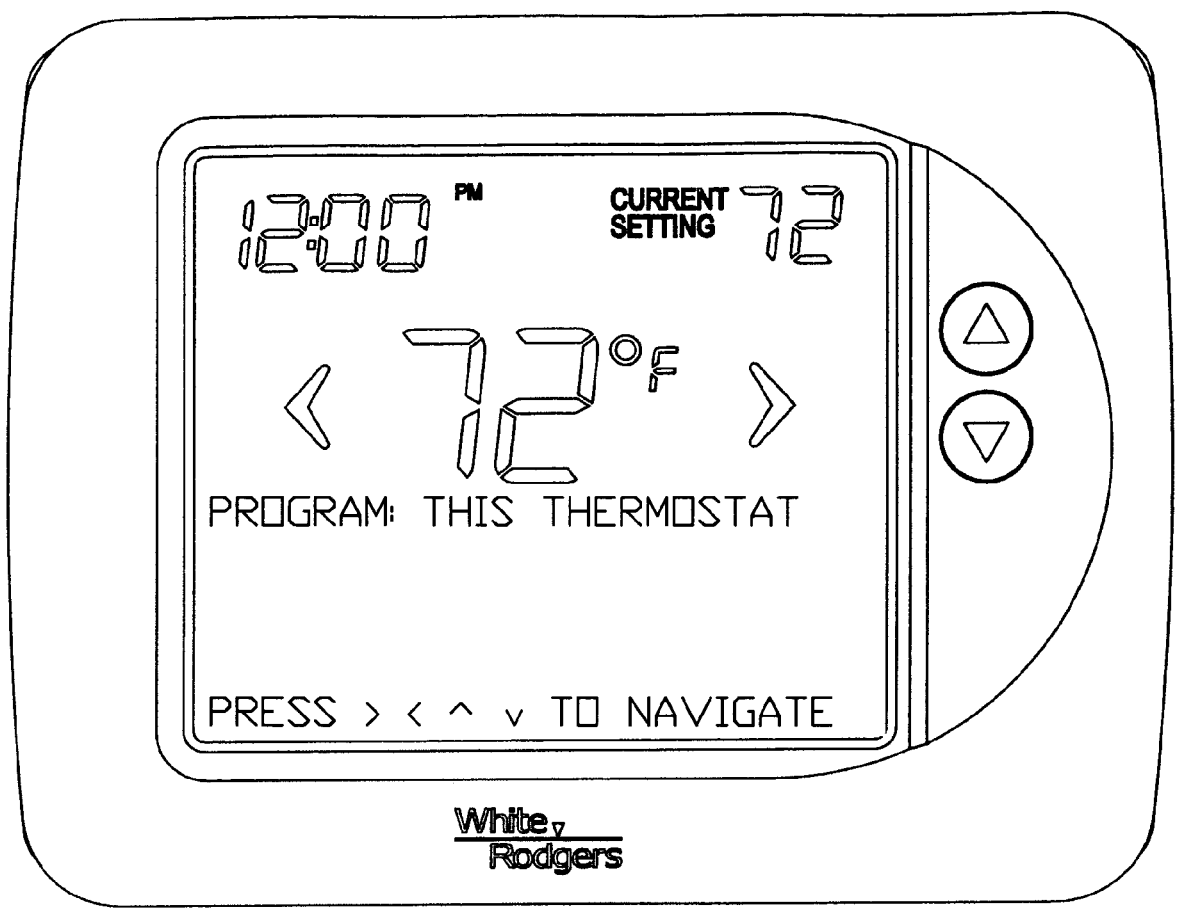
FIG. 7 is a view of the thermostat controller of FIG. 5, displaying a menu option for programming the thermostat or other interactive controllers in accordance with the principles of the present invention.
Figure 8:
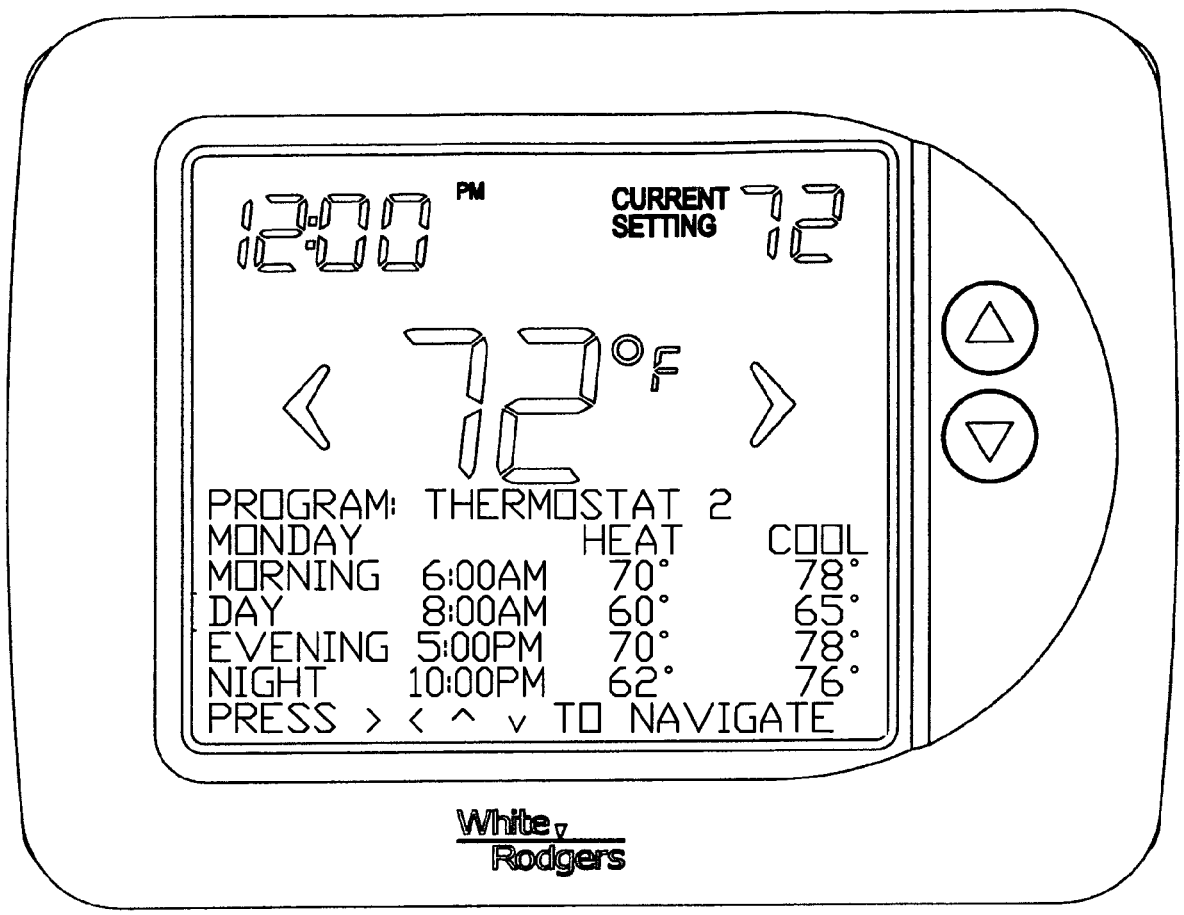
FIG. 8 is a view of the thermostat controller of FIG. 5, displaying programmed settings of another thermostat controller in accordance with the principles of the present invention.

In the above exemplary embodiment, the homeowner may optionally choose to install a second thermostat controller on the second floor of the home, which second thermostat could be connected to the network. The existing thermostat controller can automatically identify the second thermostat controller, for communicating the node types of either the existing air conditioning controllers, the node types of the second air conditioning controllers, or both. Likewise, the existing thermostat controller can further allow a user to utilize the existing thermostat controller as an interface to gain access to the second thermostat controller of the second air conditioning system for remotely configuring or modifying the second thermostat's settings. For example, the thermostat controller may display a screen (when prompted) that includes a "PROGAM" or other suitable icon selection as shown in FIG. 7. The user may press a button to program the present thermostat controller that the user is viewing, or the user may continue to press the button to select other controllers that the user may want to communicate setting information to. For example, the user may press a button to select programming of a second thermostat controller as shown in FIG. 8. The thermostat controller viewed by the user would then communicate a request to the second thermostat controller to provide setting information (such as programmed temperature settings as shown in FIG. 8). The first thermostat controller that the user is viewing would then display the settings communicated from the second thermostat controller (such as programmed temperature settings as shown in FIG. 8). Rather than the user having to go the location of both the first and second thermostat controllers and enter settings at each location, the user may simply enter selections for the second thermostat controller from the first thermostat controller. The user accordingly may remotely modify the settings, which the first thermostat controller would then communicate via the network to the selected controller such that the second thermostat controller may change its settings.

The various embodiments provide for one or more controllers in connection with a communication network for enabling transmission of signals addressed to or intended for a specific controller. While each signal may be intended for a specific controller, at least one controller may listen to signals intended for other controllers and may modify the operation of at least one component that the at least one controller has control over in response to receiving a signal that is intended for another controller which includes information about the operation of a component within the system. The controllers in the various embodiments are capable of providing cooling or heating operation in a "limp along" mode, while alerting the occupant of service or repair needs via a text message before the system becomes inoperable. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An interactive system for controlling the operation of a climate control system, the interactive system comprising:
   a two-wire network for permitting communication between one or more controllers;
   a thermostat controller, an air conditioner compressor controller, and at least a heating or ventilation apparatus controller for controlling the operation of a heating or a ventilation apparatus, the controllers being connected to each other only through each controller's individual connection to the two-wire network such that each controller sends signals directly to another controller without being transmitted through any other controller, where each of the controllers are capable of transmitting data signals that include information identifying a specific destination of the thermostat controller, the air conditioner compressor controller or the heating or ventilation apparatus controller that each data signal is intended for;
   wherein the heating or ventilation apparatus controller is configured to receive the data signals that are intended for a controller other than the heating or ventilation apparatus controller, which include information about the operation of at least one of several components in the climate control system that are not controlled by the heating or ventilation apparatus controller, and in response to which the heating or ventilation apparatus controller is capable of modifying the operation of at least one component that is controlled by the heating or ventilation apparatus controller in response to the information.

2. The interactive system of claim 1 wherein the data signals are intended for the air conditioner compressor controller, and the heating or a ventilation apparatus controller is configured to modify the operation of an air circulator blower in response to receiving the data signals.

3. The interactive system of claim 1 wherein the heating or ventilation apparatus controller is capable of modifying the operating capacity of an air circulator blower in response to receiving the data signal intended for the thermostat controller that includes information about the operating capacity of one of the several components in the climate control system.

4. The interactive system of claim 3 wherein the information indicates the compressor is only capable of operating at one of a high capacity or a reduced capacity mode of operation, and the heating or ventilation apparatus controller responsively operates the air circulator blower at a capacity level that corresponds to the high capacity or reduced capacity mode of operation of the compressor.

5. The interactive system of claim 3 wherein the information indicates the air conditioner compressor is only capable of operating intermittently, and the heating or ventilation apparatus controller responsively operates the air circulator blower intermittently to correspond to the intermittent compressor operation.

6. The interactive system of claim 2 further comprising a sensor individually connected to the two-wire network such that the sensor sends signals directly to another controller without being transmitted through any other controller, wherein the heating or ventilation apparatus controller is capable of modifying the operating capacity of the air circulator blower in response to receiving the data signals transmitted by a sensor that is intended for the thermostat controller which includes information about a sensed parameter that is out of range.

7. The interactive system of claim 6 wherein the sensor is a carbon monoxide sensor, and the sensed parameter is the presence of carbon monoxide gas that is greater than a harmful level of carbon monoxide gas.

8. The interactive system of claim 6 wherein the sensor is a pressure sensor and the sensed parameter is a sensed combustion air pressure that is above a value indicative of an inadequate level of combustion airflow to a heating or ventilation apparatus.

9. The interactive system of claim 1 wherein the heating or ventilation apparatus controller is an air handler controller that is capable of modifying the operating capacity of an air circulator blower in response to receiving the data signals that are intended for the thermostat controller which includes information about a reduced operating capacity of a heating or ventilation apparatus.

* * * * *